(12) United States Patent
Zhang

(10) Patent No.: US 11,983,398 B2
(45) Date of Patent: May 14, 2024

(54) TOUCH CONTROL METHOD FOR DEVICE HAVING FOLDABLE SCREEN AND FOLDABLE-SCREEN DEVICE

(71) Applicant: Huawei Technologies Co., Ltd., Shenzhen (CN)

(72) Inventor: Jing Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/638,912

(22) PCT Filed: Jul. 24, 2020

(86) PCT No.: PCT/CN2020/104600
§ 371 (c)(1),
(2) Date: Feb. 28, 2022

(87) PCT Pub. No.: WO2021/036628
PCT Pub. Date: Mar. 4, 2021

(65) Prior Publication Data
US 2022/0283684 A1    Sep. 8, 2022

(30) Foreign Application Priority Data
Aug. 30, 2019    (CN) .......................... 201910817743.0

(51) Int. Cl.
G06F 3/0488  (2022.01)
G06F 1/16    (2006.01)
G06F 3/04845 (2022.01)

(52) U.S. Cl.
CPC .......... *G06F 3/0488* (2013.01); *G06F 1/1641* (2013.01); *G06F 3/04845* (2013.01); *G06F 2203/04806* (2013.01)

(58) Field of Classification Search
CPC ....... G06F 2203/04802; G06F 3/04886; G06F 1/1641; G06F 1/1618; G06F 1/1652
See application file for complete search history.

(56) References Cited

U.S. PATENT DOCUMENTS 9,791,949 B2 * 10/2017 Myers .................. G06F 3/0446
9,939,844 B2 *  4/2018 Choi .................... G06F 1/1652
(Continued)

FOREIGN PATENT DOCUMENTS

CN       1103116457 A    5/2013
CN        103309594 A    9/2013
(Continued)

OTHER PUBLICATIONS

Samsung:"Samsung Galaxy Note Edge User Manual," Nov. 1, 2014, XP055267291, 196 pages.
(Continued)

*Primary Examiner* — Ryan F Pitaro
(74) *Attorney, Agent, or Firm* — Conley Rose, P.C.

(57) ABSTRACT

A foldable screen of an electronic device includes a first display region, a second display region, and a third display region. When the electronic device is in a folded form, an included angle between the first display region and the second display region is less than or equal to a first preset angle. The third display region is disposed between the first display region and the second display region. A touch control method for the electronic device includes detecting a first operation in the third display region and controlling the first display region and/or the second display region. When the electronic device is in the folded form, a primary screen and/or a secondary screen may be controlled by using an operation detected on a side screen.

20 Claims, 28 Drawing Sheets

(56) References Cited

U.S. PATENT DOCUMENTS

| | | | |
|---|---|---|---|
| 10,481,759 B2* | 11/2019 | Lee | G06F 3/04817 |
| 2013/0300697 A1 | 11/2013 | Kim et al. | |
| 2014/0198036 A1 | 7/2014 | Kim et al. | |
| 2016/0085319 A1* | 3/2016 | Kim | G06F 3/0487 |
| | | | 345/156 |
| 2016/0105542 A1* | 4/2016 | Lee | H04M 1/72403 |
| | | | 455/566 |
| 2016/0132074 A1* | 5/2016 | Kim | G06F 1/1652 |
| | | | 345/173 |
| 2016/0188197 A1* | 6/2016 | Ryu | G06F 1/1694 |
| | | | 345/156 |
| 2016/0313966 A1* | 10/2016 | Jeong | G06F 3/04883 |
| 2017/0090681 A1 | 3/2017 | Gao et al. | |
| 2017/0115944 A1* | 4/2017 | Oh | G06F 3/04845 |
| 2017/0345397 A1* | 11/2017 | Tsukamoto | G06F 3/04845 |
| 2017/0357399 A1* | 12/2017 | Lee | H04M 1/0266 |
| 2018/0121056 A1* | 5/2018 | Kyoya | G06F 1/1681 |
| 2018/0129459 A1* | 5/2018 | Sylvan | G06F 3/1423 |
| 2018/0198896 A1 | 7/2018 | Kang et al. | |
| 2018/0342226 A1* | 11/2018 | Shin | G06F 3/0487 |
| 2018/0359350 A1* | 12/2018 | Kim | H04M 1/72403 |
| 2018/0374411 A1* | 12/2018 | Yang | G06F 3/0488 |
| 2019/0028579 A1* | 1/2019 | Cho | G06F 3/04886 |
| 2019/0073113 A1* | 3/2019 | Yang | G06F 3/04886 |
| 2019/0138179 A1* | 5/2019 | Xia | G06F 1/1643 |
| 2019/0220134 A1 | 7/2019 | Sepulveda et al. | |
| 2020/0059543 A1* | 2/2020 | Chen | G06F 3/017 |
| 2020/0241732 A1* | 7/2020 | Lu | H04M 1/72469 |
| 2021/0034223 A1* | 2/2021 | Sun | G06F 3/147 |
| 2021/0173444 A1* | 6/2021 | Song | G06F 3/04886 |
| 2021/0208638 A1* | 7/2021 | Takeuchi | G06F 3/04886 |
| 2022/0035494 A1* | 2/2022 | Lee | G06F 3/14 |
| 2022/0187871 A1* | 6/2022 | Yamazaki | G06F 1/1652 |
| 2022/0283610 A1* | 9/2022 | Ran | G06F 1/1694 |
| 2022/0283684 A1* | 9/2022 | Zhang | G06F 1/1641 |
| 2022/0365675 A1* | 11/2022 | Fu | G06F 3/04886 |
| 2023/0185170 A1* | 6/2023 | Suzuki | G03B 17/425 |
| | | | 348/207.99 |

FOREIGN PATENT DOCUMENTS

| | | | |
|---|---|---|---|
| CN | 104866222 A | 8/2015 | |
| CN | 204926055 U | 12/2015 | |
| CN | 105224273 A | 1/2016 | |
| CN | 105808140 A | 7/2016 | |
| CN | 107678661 A | 2/2018 | |
| CN | 107765968 A | 3/2018 | |
| CN | 208128322 U | 11/2018 | |
| CN | 109002268 A | 12/2018 | |
| CN | 109840061 A | 6/2019 | |
| CN | 110532051 A | 12/2019 | |
| CN | 110673783 A | 1/2020 | |
| CN | 110839096 A | 2/2020 | |
| EP | 3287886 A1 | 2/2018 | |
| EP | 3322159 A1 | 5/2018 | |
| JP | 2019516187 A | 6/2019 | |
| WO | WO-2018076506 A1 * | 5/2018 | G06F 1/1618 |
| WO | 2020087299 A1 | 5/2020 | |

OTHER PUBLICATIONS

Linkup Technical Review Editing Department, "Docomo Galaxy Note Edge SC-01G Smart Guide starting from zero," 1st Edition, Iwao Kataoka, Technical Review Co., Ltd., Japan, Jan. 15, 2015, 5 pages.

* cited by examiner

TOUCH CONTROL METHOD FOR DEVICE HAVING FOLDABLE SCREEN AND FOLDABLE-SCREEN DEVICE

CROSS-REFERENCE TO RELATED APPLICATIONS

This is a U.S. National Stage of International Patent Application No. PCT/CN2020/104600 filed Jul. 24, 2020, which claims priority to Chinese Patent Application No. 201910817743.0 filed Aug. 30, 2019. Both of the aforementioned applications are hereby incorporated by reference in their entireties.

TECHNICAL FIELD

Embodiments of this application relate to the field of electronic technologies, and in particular, to a touch control method for a device having a foldable screen and a foldable-screen device.

BACKGROUND

As mobile devices such as mobile phones are applied with popularity, people have an increasingly strong requirement for large-screen mobile phones. However, the large-screen mobile phones are not very portable in application. To improve portability, a foldable-screen phone having a stretchable and deformed screen becomes a mobile phone development trend.

For the foldable-screen phone, the screen in an unfolded form is a large screen, and the screen in a folded form may include a primary screen, a secondary screen, and a side screen, where the side screen is a region at which the screen is folded.

When the foldable-screen phone is in the folded form, how to properly utilize the side screen is a problem that needs to be considered.

SUMMARY

Objectives of embodiments of this application are to provide a touch control method for a device having a foldable screen and a foldable-screen device, to properly utilize a side screen of a foldable phone, and improve user experience.

The foregoing objectives and another objective may be achieved by using features in independent claims. Further implementations are reflected in the dependent claims, the specification, and the accompanying drawings.

According to a first aspect, an embodiment of this application provides a touch control method for a device having a foldable screen. The foldable screen includes a first display region, a second display region, and a third display region. When the electronic device is in a folded form, an included angle between the first display region and the second display region is less than or equal to a first preset angle. The third display region is disposed between the first display region and the second display region. The method includes: detecting a first operation in the third display region: and controlling the first display region and/or the second display region.

It should be noted that in this embodiment of this application, when the electronic device is in the folded form, a user may control a primary screen and/or a secondary screen by using a side screen. Utilization of the side screen is improved. And also, a touch control operation on the primary screen and/or a touch control operation on the secondary screen can be transferred to the side screen, which avoids blocking the primary screen and/or the secondary screen by the touch control operation, and provides better user experience.

In a possible design, the controlling the first display region and/or the second display region includes: updating a display interface in the first display region and/or a display interface in the second display region; or controlling functions in the first display region and the second display region.

It should be noted that in this embodiment of this application, when the electronic device is in the folded form, the user may control the primary screen and/or the secondary screen by using the side screen, for example, update a display interface on the primary screen and/or a display interface on the secondary screen, or control a function on the primary screen and/or a function on the secondary screen. Utilization of the side screen is improved. The touch control operation on the primary screen and/or the touch control operation on the secondary screen can be transferred to the side screen, which avoids blocking the primary screen and/or the secondary screen by the touch control operation, and provides better user experience.

In a possible design, the method further includes: displaying a first interface in the first display region, where the first interface includes at least one control or a control, and mapping a first control in the first interface to the third display region, where the first control is retained in or deleted from the first interface; receiving an operation performed by the user on the first control; and executing a function corresponding to the first control in the first interface.

It should be noted that in this embodiment of this application, when the electronic device is in the folded form, the electronic device may map a control on the primary screen and/or a control on the secondary screen to the side screen, that is, control the primary screen and/or the secondary screen by using the side screen. Utilization of the side screen is improved. The touch control operation on the primary screen and/or the touch control operation on the secondary screen can be transferred to the side screen, which avoids blocking the primary screen and/or the secondary screen by the touch control operation, and provides better user experience.

In a possible design, the mapping a first control in the first interface to the third display region includes: using a preset control in the first interface as the first control and mapping the first control to the third display region; using a control specified by the user in the first interface as the first control and mapping the first control to the third display region; or detecting a most-frequently or least-frequently used control in the first interface as the first control and mapping the first control to the third display region.

It should be noted that in this embodiment of this application, when the electronic device is in the folded form, the electronic device may map the control on the primary screen and/or the control on the secondary screen to the side screen, that is, control the primary screen and/or the secondary screen by using the side screen. Which control/controls is mapped to the side screen may be selected by the user. This improves user experience. In this embodiment of this application, cation utilization of the side screen can be improved. In this embodiment of this application, the touch control operation on the primary screen and/or the touch control operation on the secondary screen can be transferred to the side screen, which avoids blocking the primary screen and/or the secondary screen by the touch control operation, and provides better user experience.

In a possible design, when a movie playing interface is displayed in the first display region and/or a movie playing interface is displayed in the second display region, the detecting a first operation in the third display region, and controlling the first display region and/or the second display region includes: detecting the first operation in the third display region; and performing fast-forwarding or rewinding in the movie playing interface.

For example, if a movie playing interface is displayed on the primary screen and/or a movie playing interface is displayed on the secondary screen, the user may fast-forward or rewind a movie by using the side screen. In the conventional technology, a fast-forward operation or a rewind operation on the primary screen/the secondary screen blocks a movie picture, resulting in poor user experience. In this embodiment of this application, the fast-forward operation or the rewind operation is transferred to the side screen, which avoids blocking a movie picture, and provides better user experience.

In a possible design, when an image preview interface is displayed in the first display region and/or an image preview interface is displayed in the second display region, and the image preview interface includes a first image, the detecting a first operation in the third display region, and controlling the first display region and/or the second display region includes: detecting the first operation in the third display region; and zooming in or zooming out the first image.

For example, if an image is displayed on the primary screen and/or an image is displayed on the secondary screen, the user may zoom out or zoom in the image by using the side screen. In the conventional technology, a zoom-in operation or a zoom-out operation on the primary screen/the secondary screen blocks image content, resulting in poor user experience. In this embodiment of this application, the zoom-in operation or the zoom-out operation is transferred to the side screen, which avoids blocking image content, and provides better user experience.

In a possible design, the controlling the first display region and/or the second display region includes: controlling the first display region when it is determined that a first touch area in the first display region is smaller than a second touch area in the second display region; or controlling the second display region when it is determined that a first touch area in the first display region is larger than a second touch area in the second display region.

For example, in this embodiment of this application, the electronic device may determine whether the primary screen faces the user or the secondary screen faces the user. The primary screen is controlled by using an operation on the side screen if the primary screen faces the user, or the secondary screen is controlled by using an operation on the side screen if the secondary screen faces the user. The electronic device may determine, in a plurality of manners, whether the primary screen or the secondary screen faces the user. For example, when a first contact area on the primary screen is greater than a second contact area on the secondary screen, it indicates that the primary screen is back to the user, and the secondary screen faces the user. For another example, when a second contact area on the secondary screen is greater than a first contact area on the primary screen, it indicates that the secondary screen is back to the user, and the primary screen faces the user.

In a possible design, the controlling the first display region and/or the second display region includes: controlling the first display region when it is determined that a first distance between the second display region and the user is longer than a second distance between the first display region and the user; or controlling the second display region when it is determined that a second distance between the second display region and the user is shorter than a second distance between the first display region and the user.

For another example, the electronic device may further determine, based on a distance between the primary screen and the user and a distance between the secondary screen and the user, whether the primary screen faces the user or the secondary screen faces the user.

In a possible design, the controlling the first display region and/or the second display region includes: controlling the first display region when it is determined that an image captured by a first camera on a first screen on which the first display region is located includes a user-specific feature; or controlling the second display region when it is determined that an image captured by a second camera on a second screen on which the second display region is located includes a user-specific feature.

For another example, the electronic device may further determine, based on images captured by cameras respectively disposed on a first screen on which the primary screen is located and a second screen on which the secondary screen is located, to determine whether the primary screen faces the user or the secondary screen faces the user.

In a possible design, the controlling the first display region and/or the second display region includes: controlling the first display region when it is determined that the first display region is screen-on and the second display region is screen-off; or controlling the second display region when it is determined that the first display region is screen-off and the second display region is screen-on.

For another example, the secondary screen is controlled by using an operation on the side screen if the primary screen is off and the secondary screen is on; or the primary screen is controlled by using an operation on the side screen if the secondary screen is off and the primary screen is on.

In a possible design, the electronic device may further adjust display brightness in the first display region and/or the second display region, or adjusts volume of the electronic device.

It should be noted that the electronic device may further adjust the display brightness or the volume by using an operation on the side screen.

In a possible design, the first operation includes any one of a tap operation, a double-tap operation, a touch and hold operation, a slide operation, or a hold and slide operation.

It should be understood that the foregoing several first operations are merely examples rather than limitations.

According to a second aspect, an embodiment of this application further provides an electronic device. The electronic device includes a foldable screen, one or more processors, and one or more memories. The one or more memories store one or more computer programs, and the one or more computer programs include instructions. When the instructions are executed by the one or more processors, the electronic device is enabled to perform the technical solution in any one of the first aspect or the possible designs of the first aspect.

According to a third aspect, an embodiment of this application further provides an electronic device. The electronic device includes modules/units that perform the method in any one of the first aspect or the possible designs of the first aspect. These modules/units may be implemented by hardware, or may be implemented by hardware by executing corresponding software.

According to a fourth aspect, an embodiment of this application further provides a chip. The chip is coupled to a memory in an electronic device, and performs the technical solution in any one of the first aspect of the embodiments of this application or the possible designs of the first aspect. In this embodiment of this application, "coupling" means that two components are directly or indirectly connected to each other.

According to a fifth aspect, an embodiment of this application further provides a computer-readable storage medium. The computer-readable storage medium includes a computer program. When the computer program is run on an electronic device, the electronic device is enabled to perform the technical solution in any one of the first aspect of the embodiments of this application or the possible designs of the first aspect.

According to a sixth aspect, an embodiment of this application further provides a computer program product. When the computer program product runs on an electronic device, the electronic device is enabled to perform the technical solution in any one of the first aspect of the embodiments of this application or the possible designs of the first aspect.

According to a seventh aspect, an embodiment of this application further provides a graphical user interface on an electronic device. The electronic device has a foldable screen, one or more memories, and one or more processors. The one or more processors are configured to execute one or more computer programs stored in the one or more memories. The graphical user interface includes a graphical user interface displayed when the electronic device performs the technical solution in any one of the first aspect of the embodiments of this application or the possible designs of the first aspect.

DESCRIPTION OF EMBODIMENTS

Figure 1:
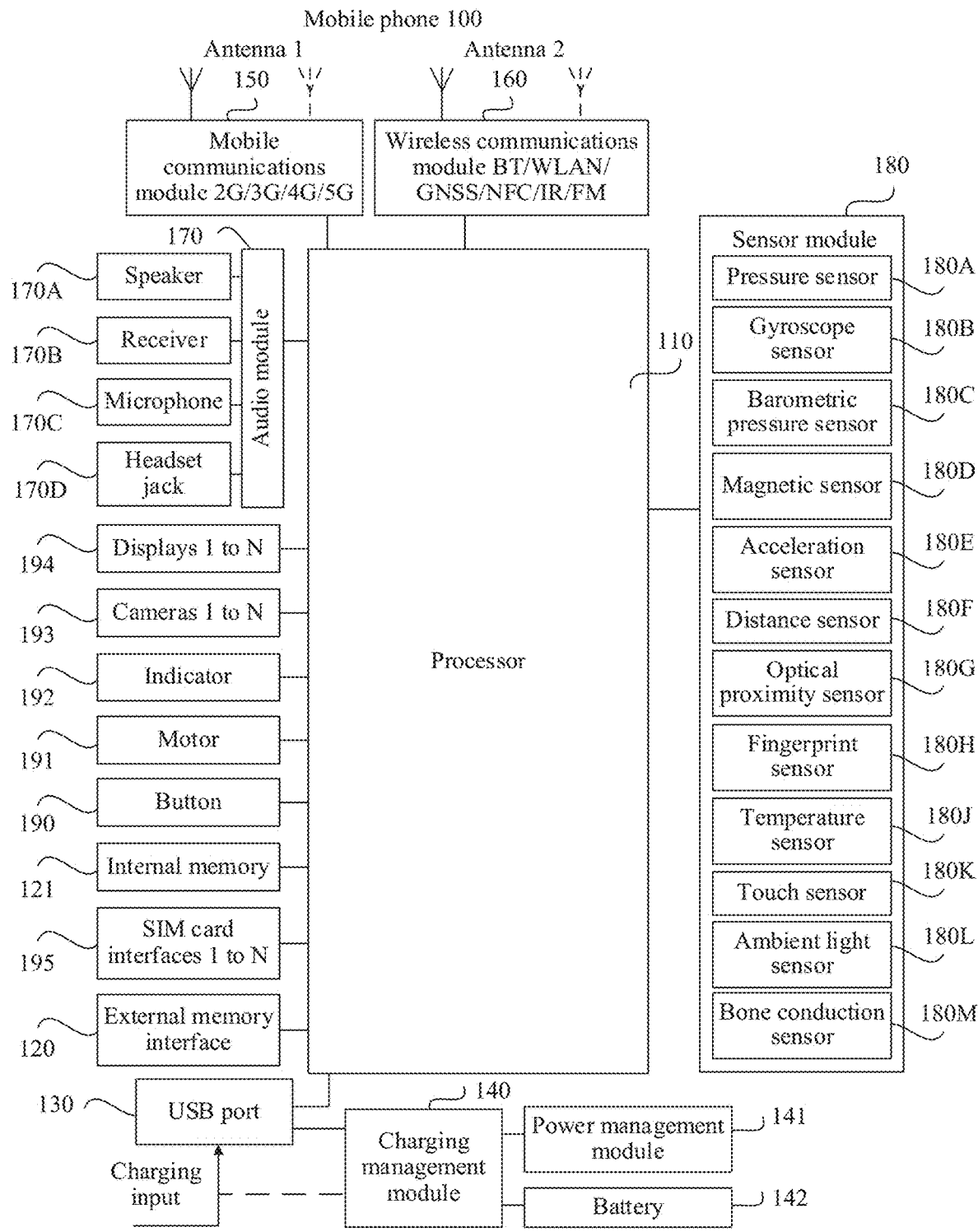
FIG. 1 is a schematic diagram of a hardware structure of an electronic device according to an embodiment of this application.

The following describes in detail the technical solutions in embodiments of this application with reference to the accompanying drawings in the following embodiments of this application.

Terms used in the following embodiments are merely intended to describe specific embodiments, but are not intended to limit this application. Terms "one". "a". "the", "the foregoing", "this", and "the one" of singular forms used in this specification and the appended claims of this application are also intended to include forms like "one or more", unless otherwise specified in the context clearly. It should be further understood that, in the embodiments of this application, "one or more" means one, two, or more. In addition, "and/or" describes an association relationship between associated objects, and indicates that three relationships may exist. For example, A and/or B may indicate cases in which only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referencing a same embodiment, instead, they mean "one or more but not all of the embodiments", unless otherwise specifically emphasized in other ways. The terms "include", "have", and variants of the terms all mean "include but are not limited to", unless otherwise specifically emphasized in other ways.

Some terms of the embodiments of this application are first described below, to help a person skilled in the art has a better understanding.

In the embodiments of this application, "at least one" means one or more, and "a plurality of" means two or more. In addition, it should be understood that in the descriptions of this application, terms such as "first" and "second" are merely used for distinguishing and description, but should not be understood as indicating or implying relative importance, or should not be understood as indicating or implying a sequence.

An application (application, app) program in the embodiments of this application may be referred to as an application for short, and is a software program that can implement one or more specific functions. Generally, a plurality of applications may be installed on an electronic device, for example, an instant messaging application, a video application, an audio application, and an image shooting application. The instant messaging application may be, for example, a "Messages" application, WeChat (WeChat), WhatsApp Messenger, LINE (LINE), image sharing (Instagram), Kakao Talk, and DingTalk. The image shooting application may include, for example, a camera application (a system camera or a third-party camera application). The video application may include, for example, YouTube, Twitter, TikTok, iQIYI, and Tencent Video. The audio application may include, for example, KuGou, EMUMO, and QQ music. The application mentioned in the following embodiments may be an application installed before delivery of the electronic device, or may be an application downloaded from a network or obtained from another electronic device by a user in a process of using the electronic device.

An embodiment of this application provides a touch control method. The method may be applied to any electronic device having a side screen, such as a mobile phone, a tablet computer, a wearable device (for example, a smartwatch, a smart band, and a smart helmet), a vehicle-mounted device, a smart home, an augmented reality (augmented reality, AR) device/a virtual reality (virtual reality, VR) device, a notebook computer, an ultra-mobile personal computer (ultra-mobile personal computer, UMPC), a netbook, or a personal digital assistant (PDA). In the touch control method provided in this embodiment of this application, the side screen of the electronic device may be used as a touch control region, that is, a user may perform a touch control operation on the side screen to control the electronic device. In some embodiments, the electronic device having the side screen may be an electronic device having a curved screen. For example, the curved screen is disposed on a front surface, a side surface, or the like of the electronic device. A display region corresponding to the front surface of the electronic device may be used as a primary screen, and a display region corresponding to the side surface of the electronic device may be used as a side screen. For another example, the electronic device having the side screen may alternatively be an electronic device configured with a foldable screen, for example, a foldable-screen phone. The foldable-screen phone is used as an example. When the foldable-screen phone is in a folded form, a bent display region on the foldable screen may be used as a side screen.

It should be noted that the touch control method provided in this embodiment of this application may be applied to any electronic device having the side screen. Details are not listed one by one in this embodiment of this application. The following embodiments mainly provides descriptions by using an electronic device having a foldable screen as an example.

For example, FIG. 1 is a schematic diagram of a structure of an electronic device having a foldable screen.

As shown in FIG. 1, the foldable electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the foldable electronic device. The controller may generate an operation control signal based on instruction operation code and a time sequence signal, to complete control of instruction reading and instruction execution. A memory may be further disposed in the processor 110, and is configured to store an instruction and data. In some embodiments, the memory in the processor 110 is a cache. The memory may store an instruction or data that has been used or is cyclically used by the processor 110. If the processor 110 needs to use the instruction or the data again, the processor may directly invoke the instruction or the data from the memory. This avoids repeated access and reduces a waiting time of the processor 110, and improves system efficiency.

The USB port 130 is a port that conforms to a USB standard specification, and may be specifically a mini USB port, a micro USB port, a USB type-C port, or the like. The USB port 130 may be used to connect to a charger for charging the foldable electronic device, or may be used to transmit data between the foldable electronic device and a peripheral device. The charging management module 140 is configured to receive a charging input from the charger. The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like.

A wireless communication function of the foldable electronic device may be implemented through the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the foldable electronic device may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the foldable electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, and the like and that is applied to the foldable electronic device. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the foldable electronic device is coupled to the mobile communications module 150, and the antenna 2 is coupled to the wireless communications module 160, so that the foldable electronic device may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The display 194 is configured to display a display interface of an application, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), Mini-LED, Micro-LED, Micro-OLED, quantum dot light emitting diodes (quantum dot light emitting diodes, QLED), or the like. In some embodiments, the foldable electronic device may include one or N displays 194, where N is a positive integer greater than 1.

The camera 193 is configured to capture a static image or a video. In some embodiments, the camera 193 may include at least one camera, for example, one front-facing camera and one rear-facing camera.

The internal memory 121 may be configured to store computer-executable program code. The executable program code includes instructions. The processor 110 runs the instructions stored in the internal memory 121 to execute various function applications of the foldable electronic device and data processing. The internal memory 121 may include a program storage area and a data storage area. The program storage area may store an operating system, software code of at least one application (such as an iQIYI application or a WeChat application), and the like. The data storage area may store data (for example, an image or a video) generated in a process of using the foldable electronic device, and the like. In addition, the internal memory 121 may include a high-speed random access memory, and may further include a nonvolatile memory, for example, at least one magnetic disk storage device, a flash memory, and a universal flash storage (universal flash storage, UFS).

The external memory interface 120 may be configured to connect to an external memory card, for example, a micro SD card, to extend a storage capability of the foldable electronic device. The external memory card communicates with the processor 110 through the external memory interface 120, to implement a data storage function. For example, files such as a picture and a video are stored in the external memory card.

The foldable electronic device may implement an audio function, for example, music playing and recording, through the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a motion posture of the foldable electronic device. In some embodiments, an angular velocity of the foldable electronic device around three axes (namely, axes X, Y, and Z) may be determined by using the gyroscope sensor 180B.

The gyroscope sensor 180B may be configured to implement image stabilization during shooting. The barometric pressure sensor 180C is configured to measure barometric pressure. In some embodiments, the foldable electronic device calculates an altitude based on a barometric pressure value measured by the barometric pressure sensor 180C, to assist in positioning and navigation. The magnetic sensor 180D includes a Hall effect sensor. The foldable electronic device may detect opening and closing of a flip leather case by using the magnetic sensor 180D. In some embodiments, when the foldable electronic device is a clamshell phone, the foldable electronic device may detect opening and closing of a flip cover by using the magnetic sensor 180D. Further, a feature such as automatic unlocking upon opening of the flip cover is set based on a detected opening or closing state of the leather case or a detected opening or closing state of the flip cover. The acceleration sensor 180E may detect accelerations in various directions (usually on three axes) of the foldable electronic device, and may detect magnitude and a direction of gravity when the electronic device is still. The acceleration sensor 180E may be further configured to recognize a posture of the electronic device, and is used in screen switching between a landscape mode and a portrait mode, a pedometer, or another application.

The distance sensor 180F is configured to measure a distance. The foldable electronic device may measure the distance in an infrared or a laser manner. In some embodiments, in a shooting scenario, the foldable electronic device may measure a distance by using the distance sensor 180F, to implement quick focusing. The optical proximity sensor 180G may include, for example, a light-emitting diode (LED) and an optical detector such as a photodiode. The light-emitting diode may be an infrared light-emitting diode. The foldable electronic device emits infrared light through the light-emitting diode. The foldable electronic device detects infrared reflected light from a nearby object by using the photodiode. When sufficient reflected light is detected, the foldable electronic device may determine that there is an object near the foldable electronic device. When insufficient reflected light is detected, the foldable electronic device may determine that there is no object near the foldable electronic device. The foldable electronic device may detect, by using the optical proximity sensor 180G, that a user holds the foldable electronic device close to an ear to make a call, to automatically perform screen-off for power saving. The optical proximity sensor 180G may also be used in a leather case mode or a pocket mode to automatically unlock or lock the screen.

The ambient light sensor 180L is configured to sense ambient light brightness. The foldable electronic device may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the foldable electronic device is in a pocket, to avoid an accidental touch. The fingerprint sensor 180H is configured to collect a fingerprint. The foldable electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the foldable electronic device executes a temperature processing policy based on the temperature detected by the temperature sensor 180J. For example, when the temperature reported by the temperature sensor 180J exceeds a threshold, the foldable electronic device lowers performance of a processor located near the temperature sensor 180J, to reduce power consumption to implement thermal protection. In some other embodiments, when the temperature is less than another threshold, the foldable electronic device heats the battery 142 to prevent the foldable electronic device from being shut down abnormally due to a low temperature. In some other embodiments, when the temperature is less than still another threshold, the foldable electronic device boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the foldable electronic device at a location different from a location of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal.

The button 190 includes a power button, a volume button, and the like. The button 190 may be a mechanical button, or may be a touch button. The foldable electronic device may receive a button input, and generate a button signal input related to a user setting and function control of the foldable electronic device. The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the foldable electronic device.

It may be understood that the components shown in FIG. 1 do not constitute a specific limitation on a mobile phone. The mobile phone may further include more or fewer components than those shown in the figure, or combine some components, or split some components, or have different component arrangements. The following embodiments provide descriptions by using the foldable electronic device shown in FIG. 1 as an example.

Figure 2:
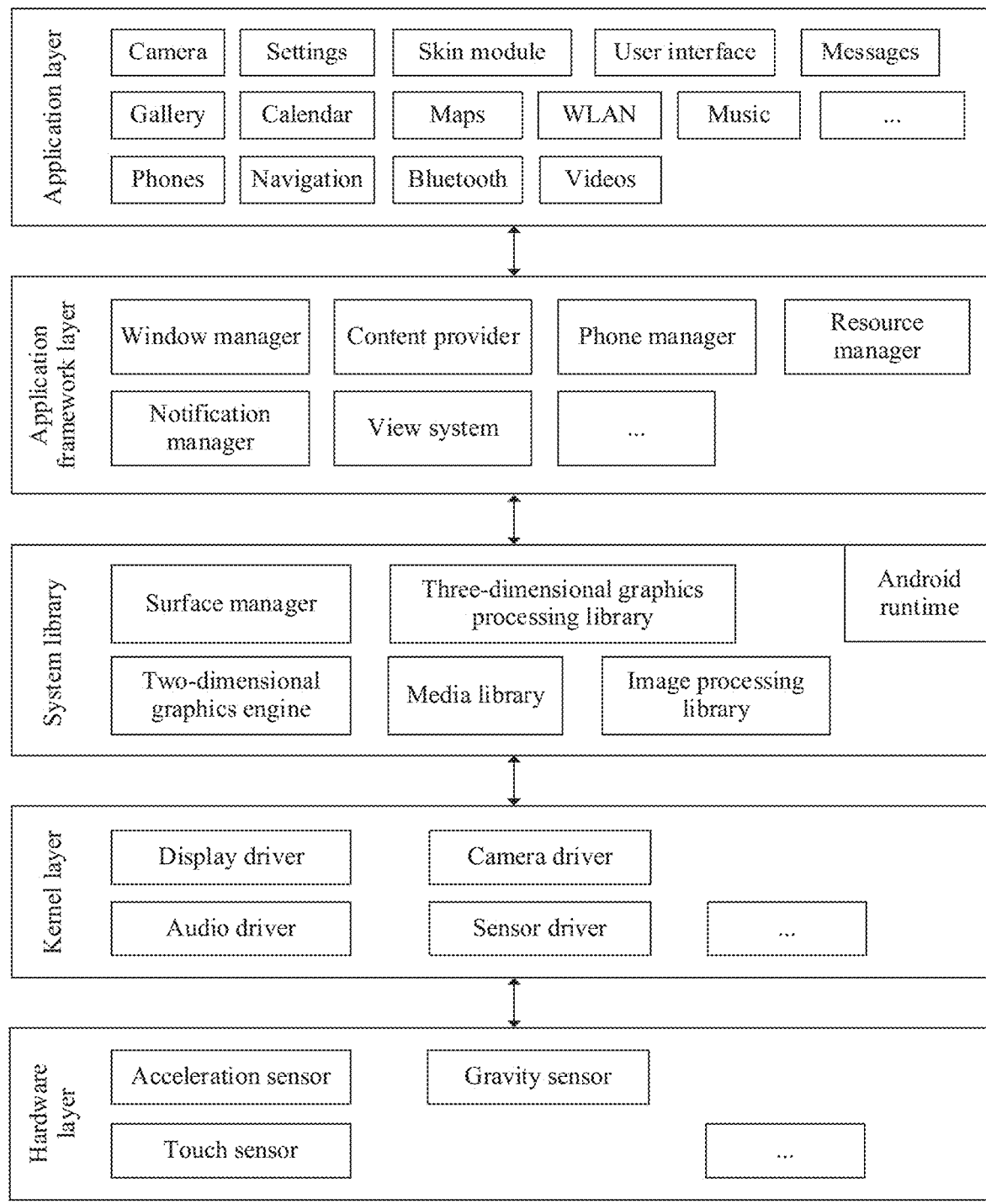
FIG. 2 is a schematic diagram of a software structure of an electronic device according to an embodiment of this application.

FIG. 2 is a block diagram of a software structure of an electronic device according to an embodiment of this application. As shown in FIG. 2, the software structure of the electronic device may be a layered architecture. For example, software may be divided into several layers, and each layer has a clear role and responsibility. The layers communicate with each other through a software interface. In some embodiments, an Android system is divided into four layers: an application layer, an application framework (framework, FWK) layer, an Android runtime (Android runtime) and system library, and a kernel layer from top to bottom.

The application layer may include a series of application packages. As shown in FIG. 2, the application layer may include "Camera", "Settings", a skin module, a user interface (user interface, UI), a third-party application, and the like. The third-party application may include "WeChat", "QQ", "Gallery", "Calendar", "Phones", "Maps", "Navigation", "WLAN", "Bluetooth", "Music", "Videos", "Messages", and the like.

The application framework layer provides an application programming interface (application programming interface, API) and a programming framework for an application at the application layer. The application framework layer may include some predefined functions. As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android. The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of audio and video in a plurality of commonly used formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system library may further include a form detection module, configured to identify a physical form of the electronic device. For example, the form detection module may be configured to determine the physical form of the electronic device based on sensor data uploaded by various types of sensors at a hardware layer. The physical form may include a folded form, an unfolded form, a semi-folded form with a specific angle, and the like. The system library may further include a coordinate mapping module, configured to: record first location coordinates of a first display region/control on a side screen and second location coordinates of a second display region/control on a primary screen/secondary screen, and construct a mapping relationship between the first location coordinates and the second location coordinates.

The kernel layer is a layer between hardware and software. The kernel layer includes at least a display driver, a camera driver, an audio driver, and a sensor driver.

The hardware layer may include various types of sensors, for example, an acceleration sensor, a gyroscope sensor, and a touch sensor in this embodiment of this application.

The following describes an example of working procedures of software and hardware of an electronic device with reference to the touch control method in the embodiments of this application.

In an example, a sensor at the hardware layer may collect sensor data. For example, the touch sensor at the hardware layer detects a first operation that a user selects a first display region/control on the side screen. The hardware layer may send the sensor data to the system library by using the kernel layer. A coordinate mapping module in the system library may store a mapping relationship between first coordinates of the first display region/control on the side screen and second coordinates of a second display region/control on a primary screen. Therefore, the coordinate mapping module may determine the second coordinates corresponding to the first coordinates, where the second coordinates are coordinates on the primary screen. The system library controls, by using the kernel layer, the hardware layer to respond to an operation on the second coordinates on the primary screen.

FIG. 3(a) to FIG. 3(d) are schematic diagrams of a plurality of physical forms of an electronic device having a foldable screen according to an embodiment of this application. FIG. 4 is a schematic diagram of unfolded angles corresponding to different physical forms of the electronic device having the foldable screen according to this embodiment of this application. The following embodiment describes the electronic device with reference to FIG. 3 and FIG. 4.

Figure 3A:
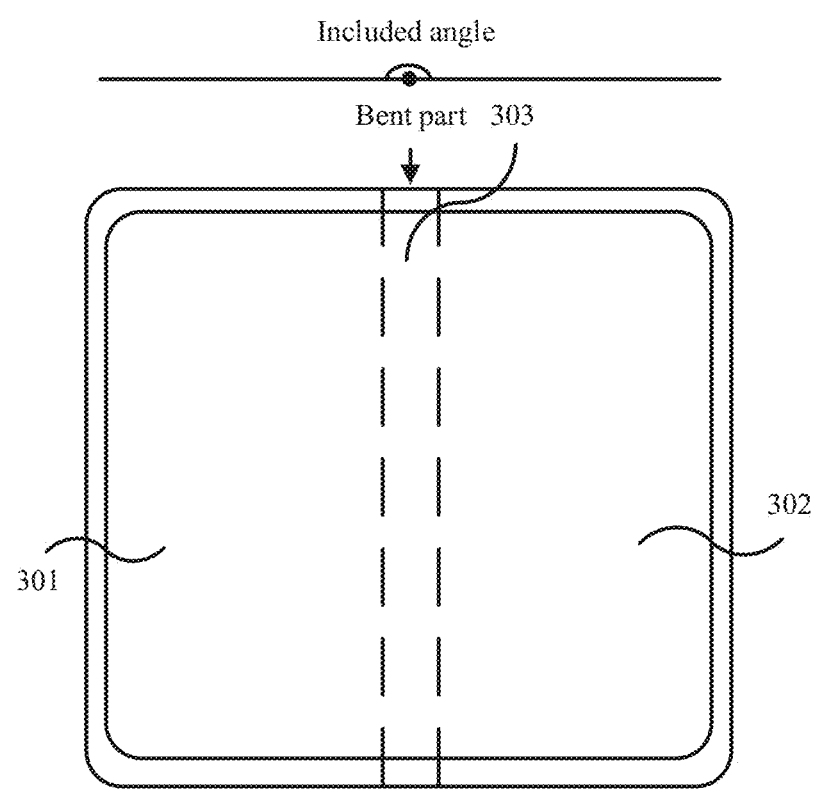
FIG. 3(a) to FIG. 3(d) are schematic diagrams of physical forms of a left-right collapsible foldable electronic device according to an embodiment of this application.

As shown in FIG. 3(a), a display region on the foldable screen of the electronic device may include three regions: a first display region 301, a second display region 302, and a third display region 303, where the third display region 303 may be a foldable region. When the third display region 303 is bent or deformed, the third display region 303 may form a side screen, as shown in FIG. 3(b), FIG. 3(c), and FIG. 3(d).

In some embodiments, the foldable screen of the electronic device may be an entire screen. The first display region, the second display region, and the third display region may be different regions on the entire screen. In some other embodiments, the foldable screen of the electronic device may be formed by splicing a plurality of screens, for example, formed by splicing three screens, where the first display region is a display region on a first screen, the second display region is a display region on a second screen, and the third display region is a display region on a third screen. This is not limited in the embodiments of this application. It should be understood that the first display region on the foldable screen may be used as a primary screen, and the second display region may be used as a secondary screen; or the first display region may be used as a secondary screen, and the second display region may be used as a primary screen. The primary screen and the secondary screen may have a same function or different functions. Specifically, which region is used as the primary screen and which region is used as the secondary screen may be specified by a user, or may be set by default before delivery of the foldable electronic device. This is not limited in the embodiments of this application.

In some embodiments, when included angles between the first display region 301 and the second display region 302 on the foldable screen are different, the electronic device may form different physical forms, for example, a folded form, a semi-folded form with a specific angle, or an unfolded form. It should be understood that division of the screens of the foldable electronic device into physical forms and definition of each physical form are not limited in the embodiments of this application.

Figure 3B:
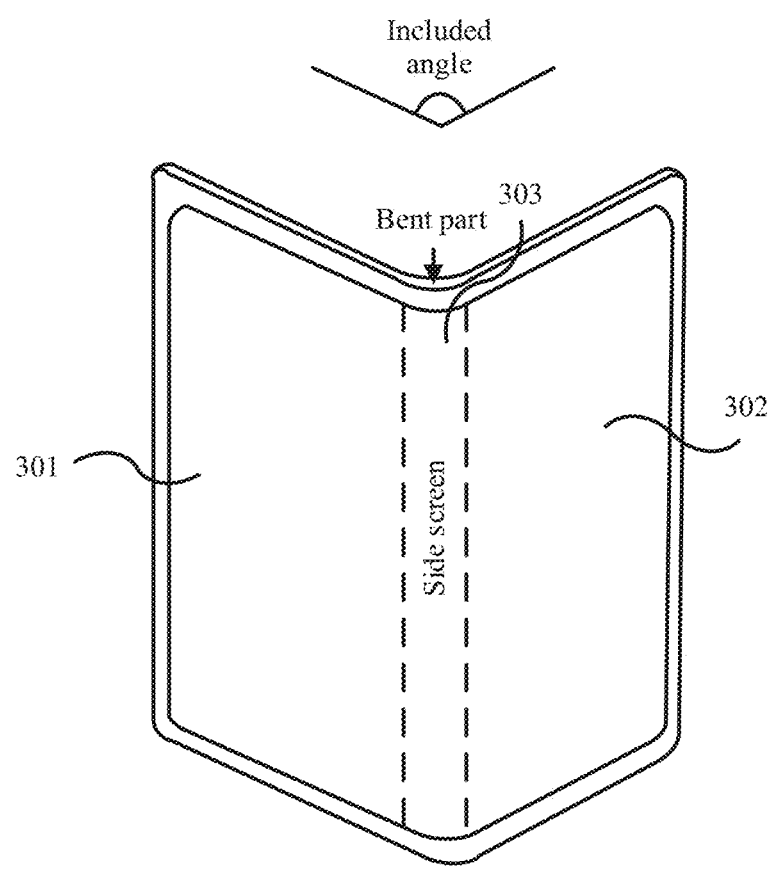
Figure 3C:
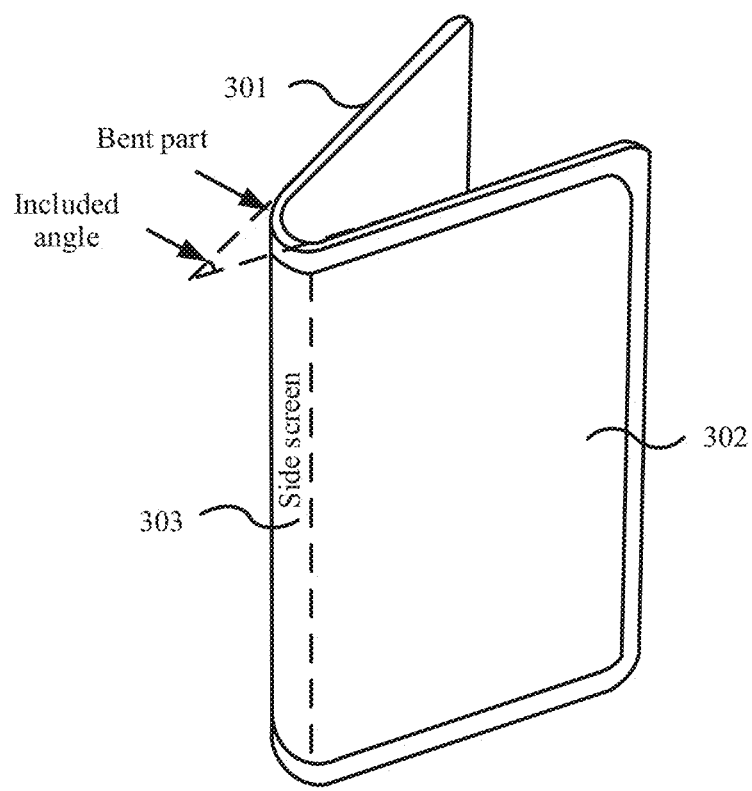
Figure 3D:
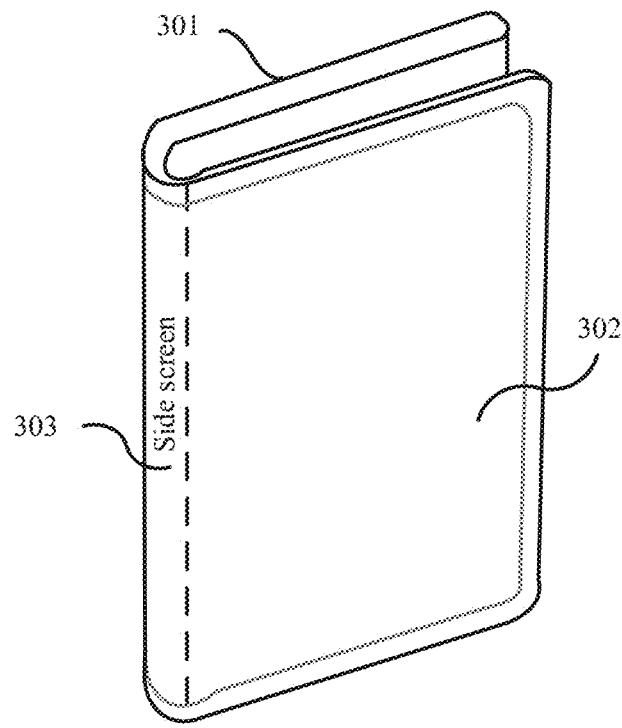
Figure 4:
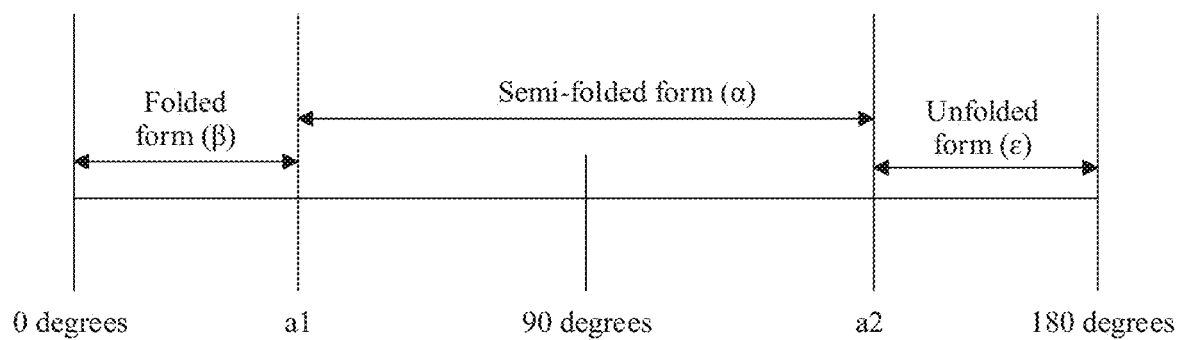
FIG. 4 is a schematic diagram of unfolded angles corresponding to different physical forms of a foldable electronic device according to an embodiment of this application.

For example, when the electronic device is in an unfolded form, the electronic device may be shown in FIG. 3(a) or in FIG. 3(b). Specifically, when the electronic device is in the unfolded form, an included angle between the first display region 301 and the second display region 302 is a first angle ε. As shown in FIG. 4, a2≤ε≤180 degrees, where a2 is greater than 90 degrees and less than or equal to 180 degrees. For example, a2 may be 150 degrees, or 180 degrees.

For example, when the electronic device is in a semi-folded form, the electronic device may be shown in FIG. 3(c). Specifically, when the electronic device is in the semi-folded form, an included angle between the first display region 301 and the second display region 302 is a second angle α. As shown in FIG. 4, a1≤α≤a2, where a1 is greater than 0 degrees and less than or equal to 90 degrees, and a2 is greater than or equal to 90 degrees and less than 180 degrees. For example, a1 may be 90 degrees, and a2 may be 150 degrees.

For example, when the electronic device is in a folded form, the electronic device may be shown in FIG. 3(d). Specifically, when the electronic device is in the folded form, an included angle between the first display region 301 and the second display region 302 is a third included angle β. As shown in FIG. 4, 0≤β≤a1, where a1 is greater than or equal to 0 degrees and less than or equal to 90 degrees. For example, a1 may be 0 degrees, or 5 degrees. It should be noted that a specific value range in the embodiments of this application is merely an example rather than a limitation.

Figure 5A:
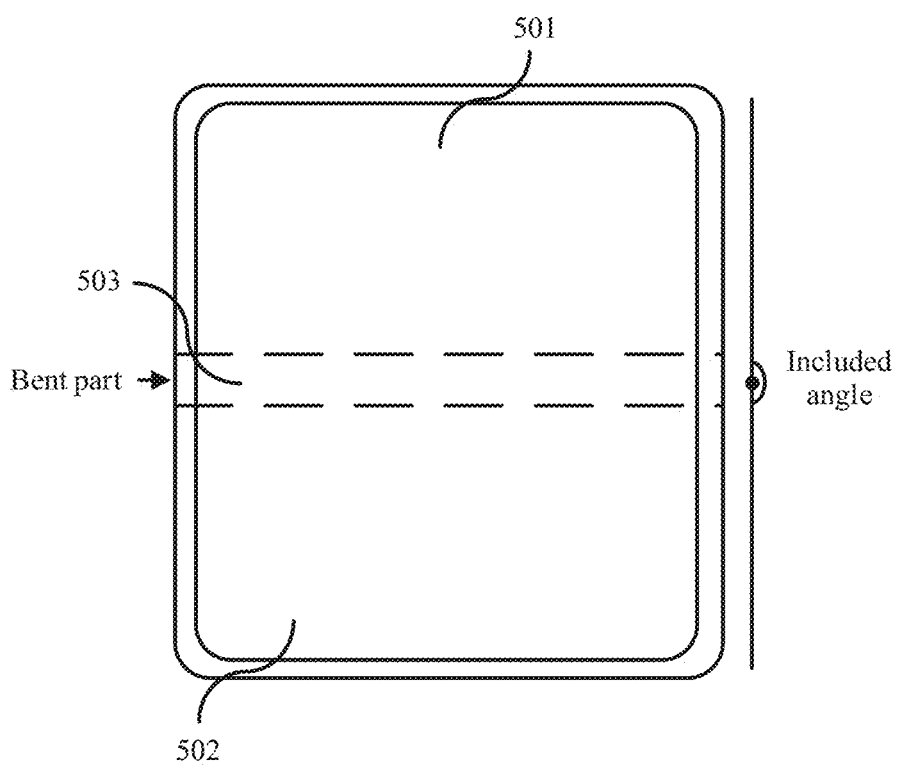
FIG. 5(a) to FIG. 5(d) are schematic diagrams of physical forms of an up-down collapsible foldable electronic device according to an embodiment of this application.
Figure 5B:
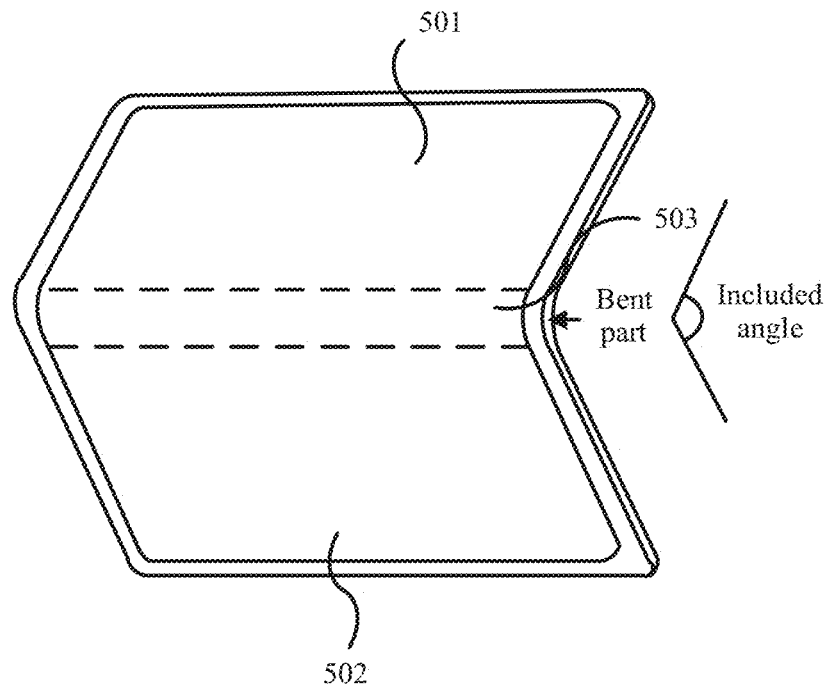
Figure 5C:
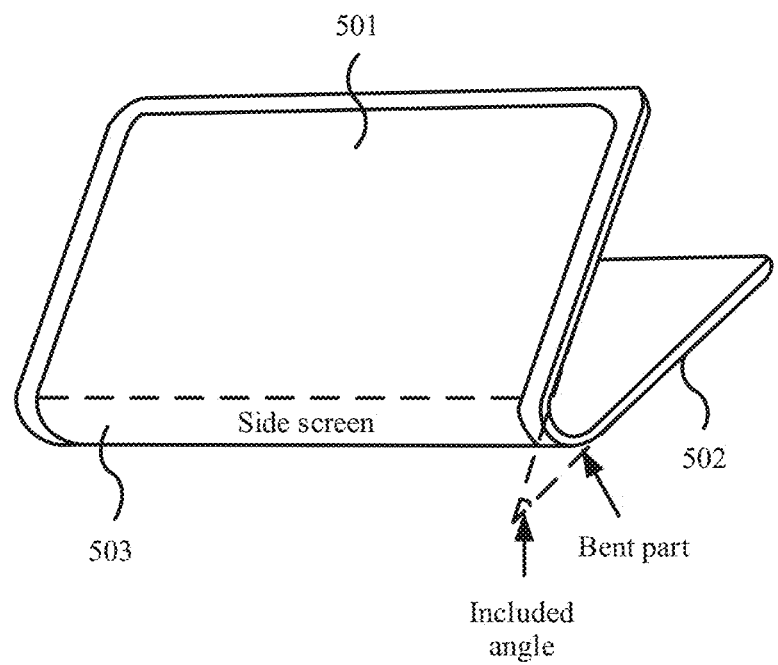
Figure 5D:
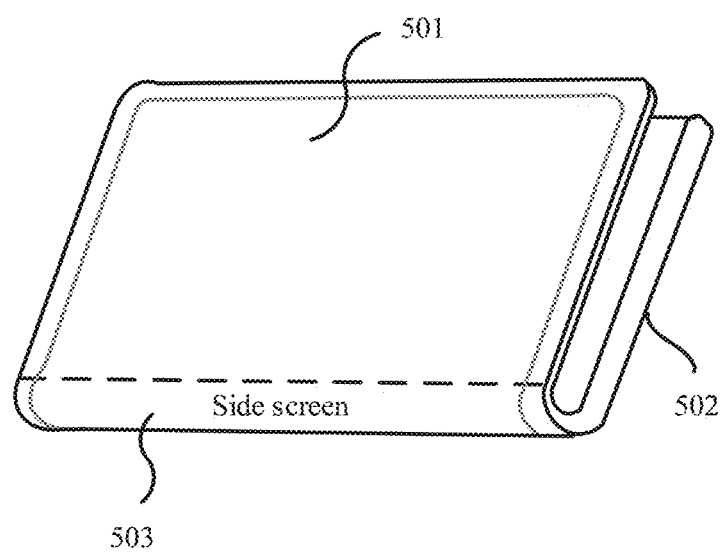

In the foregoing embodiments, the electronic device is folded left and right. In some other embodiments, the electronic device may alternatively be folded up and down. For example, in FIG. 3(a), a bent part may further be horizontally distributed in FIG. 3(a), so that the electronic device may be folded up and down. For example, as shown in FIG. 5(a), a foldable screen of an electronic device may include a first display region 501, a second display region 502, and a third display region 503. The third display region 503 may be a foldable region. When the third display region 503 is bent or deformed, an included angle between the first display region 501 and the second display region 502 changes. Therefore, the up-down collapsible electronic device may also include three physical forms, for example, a folded form, a semi-folded form, and an unfolded form. The folded form may be a form shown in FIG. 5(d), the semi-folded form may be a form shown in FIG. 5(c), and the unfolded form may be a form shown in FIG. 5(a) or FIG. 5(b).

In some embodiments, the electronic device may be folded left and right or folded up and down. Alternatively, the electronic device may be folded up and down and folded left and right. The touch control method provided in the embodiments of this application may be applied to an electronic device folded in various directions. The following embodiments provides descriptions by using an up-down collapsible foldable electronic device as an example, for example, the electronic device shown in FIG. 5(a) to FIG. 5(d). Specifically, for the foldable electronic device shown in FIG. 5(a) to FIG. 5(d), it is assumed that the first display region 501 is used as a primary screen, and the second display region 502 is used as a secondary screen.

In the embodiments of this application, when the electronic device configured with the foldable screen is in a folded form, a side screen may be used as a region for a touch control operation of a user, that is, a user may perform a touch control operation on the side screen, to control content displayed on the primary screen and/or the secondary screen of the electronic device. In a possible scenario, when the electronic device is in the folded form, the primary screen displays a first interface of a first application, and the secondary screen and the side screen are off. After the electronic device detects a first touch control operation performed by the user on the side screen, the electronic device may map the first touch control operation to a second touch control operation in the first interface on the primary screen, to control the first interface on the primary screen. In another possible scenario, when the electronic device is in the folded form, if the electronic device detects a first touch control operation performed by the user on the side screen, the electronic device may adjust display brightness, volume of a speaker, and the like in response to the first touch control operation. The foregoing possible application scenarios are described in detail in the following embodiments.

Figure 6A:
FIG. 6(a) and FIG. 6(b) are schematic diagrams of holding states of a foldable electronic device according to an embodiment of this application.
Figure 6B:

In some embodiments, there may be a plurality of holding states for an up-down collapsible electronic device, for example, two holding states in FIG. 6(a) and in FIG. 6(b). In the following embodiments, the holding state shown in FIG. 6(b) is used as an example for description. For example, in the holding state shown in FIG. 6(b), a user may perform a touch control operation on a side screen by using an index finger of a left hand and/or an index finger of a right hand, to control content displayed on a primary screen.

Scenario 1:

When the electronic device is in the folded form, the primary screen displays the first interface of the first application, the secondary screen and the secondary screen are off, and a touch control function is enabled for the side screen. After the electronic device detects the first touch control operation performed by the user on the side screen, the electronic device may map the first touch control operation to the second touch control operation in the first interface on the primary screen, to control the first interface on the primary screen.

Example 1

Figure 7A:
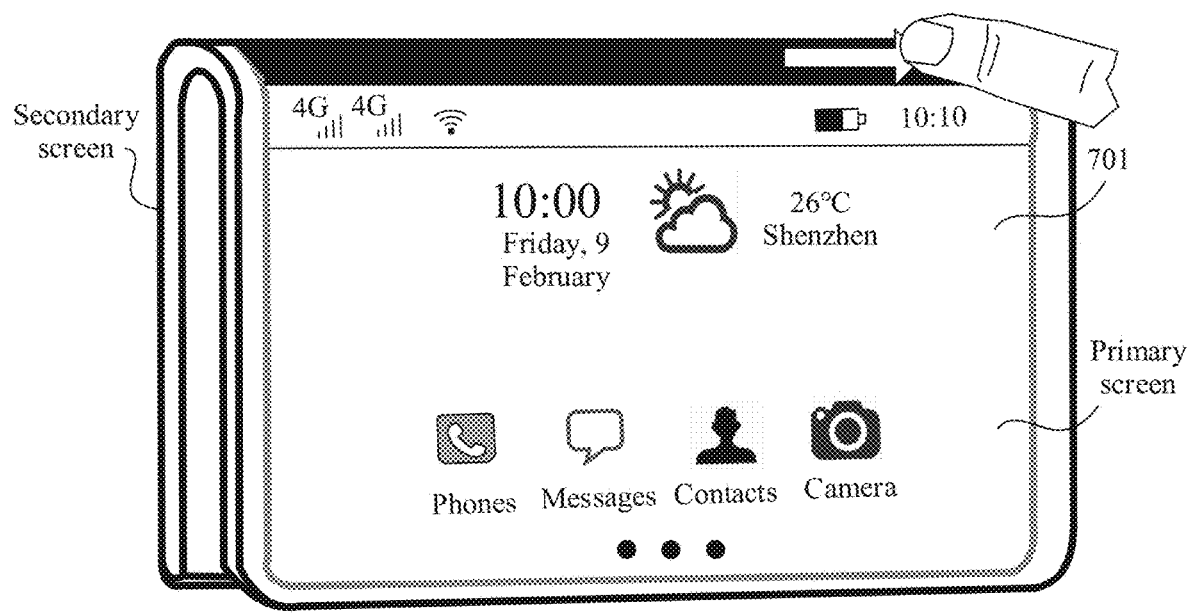
FIG. 7(a) and FIG. 7(b) are schematic diagrams of graphical user interfaces of a foldable electronic device according to an embodiment of this application.
Figure 7B:
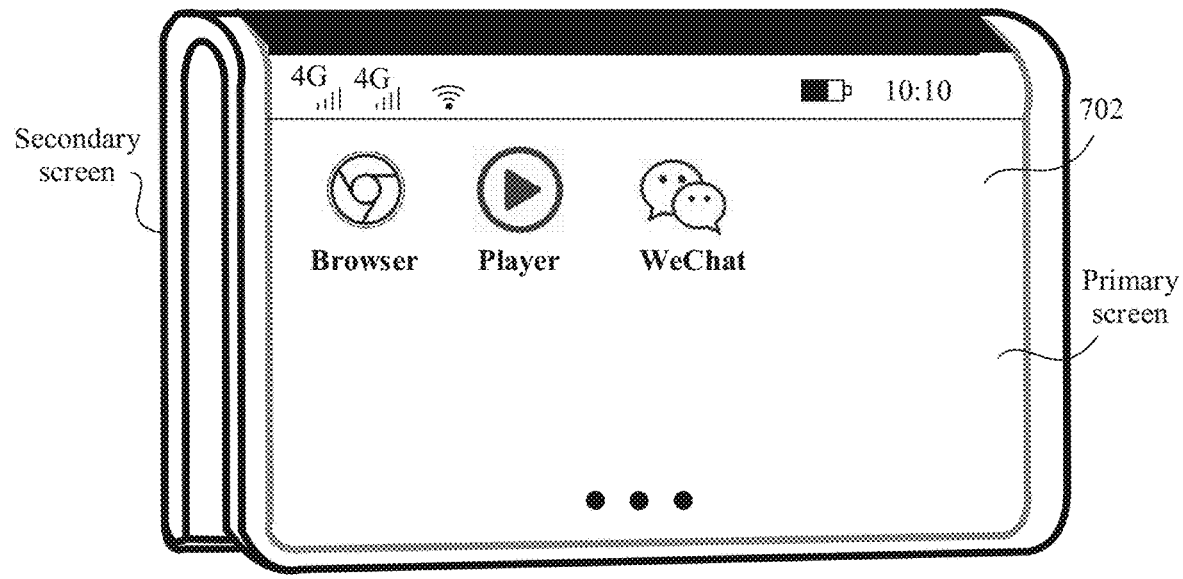

As shown in FIG. 7(a), a primary screen of an electronic device displays a home screen 701, a secondary screen and a side screen are off, and a touch control function is enabled for the side screen. The home screen 701 includes icons of one or more applications. As shown in FIG. 7(a), when the electronic device detects a right slide operation performed by a user on the side screen, the electronic device maps the right slide operation to a right slide operation on the home screen 701, and the electronic device displays another home screen 702 in response to the right slide operation. The another home screen 702 includes icons of one or more applications, as shown in FIG. 7(b). In this example, when the electronic device includes a plurality of home screens, the user may browse different home screens by performing slide operations on the side screen, so that the user selects corresponding applications on the different home screens.

Example 2

Figure 8A:
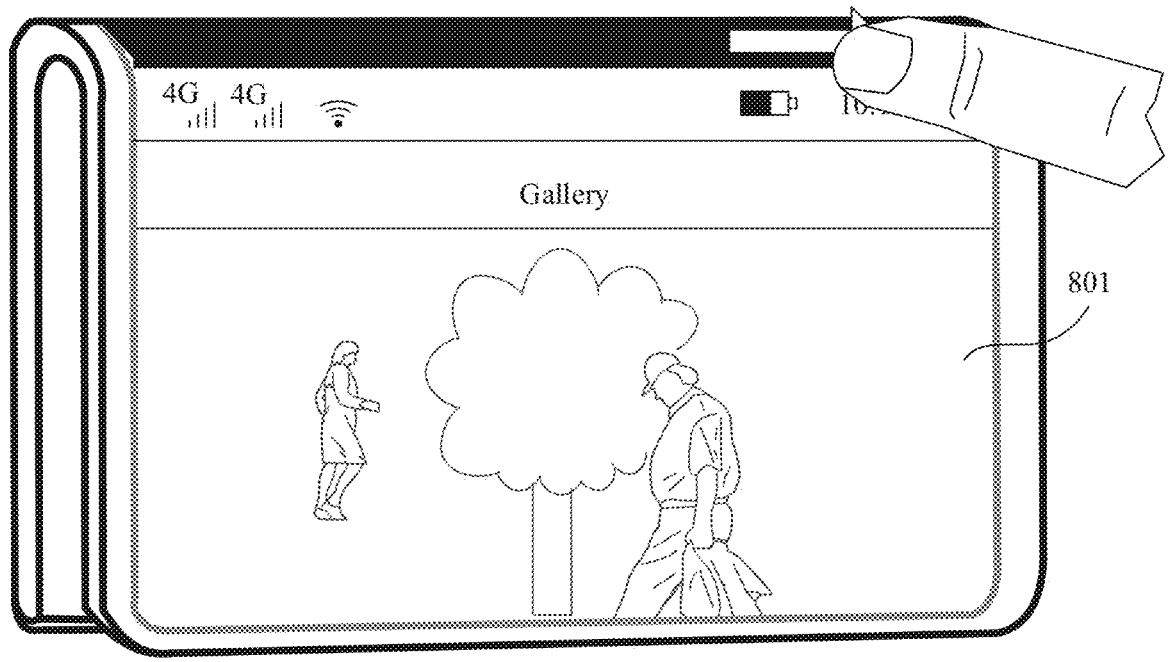
FIG. 8(a) and FIG. 8(b) are schematic diagrams of graphical user interfaces of a foldable electronic device according to an embodiment of this application.
Figure 8B:
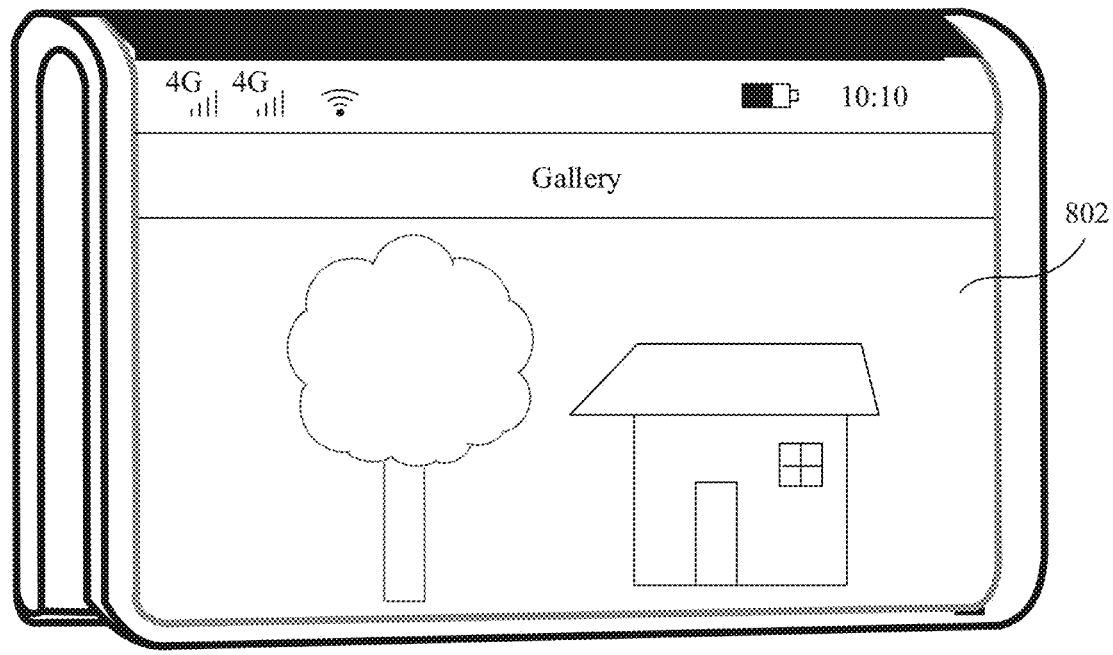

As shown in FIG. 8(a), a primary screen of an electronic device displays an image 801 from a "Gallery" application, and a secondary screen and a side screen are off. When detecting a right slide operation performed by a user on the side screen, the electronic device displays another image 802, as shown in FIG. 8(b). The image 802 is another image rather than the image 801 from the "Gallery" application. For example, when the "Gallery" application includes a plurality of albums, the image 802 and the image 801 are images in a same album. For example, the image 802 may be a next image of the image 801, that is, an image whose storage time is immediately after the image 801. When detecting a left slide operation performed by the user on the side screen, the electronic device displays a previous image of the image 801, that is, an image whose storage time is immediately before the image 801.

Example 3

Figure 9A:
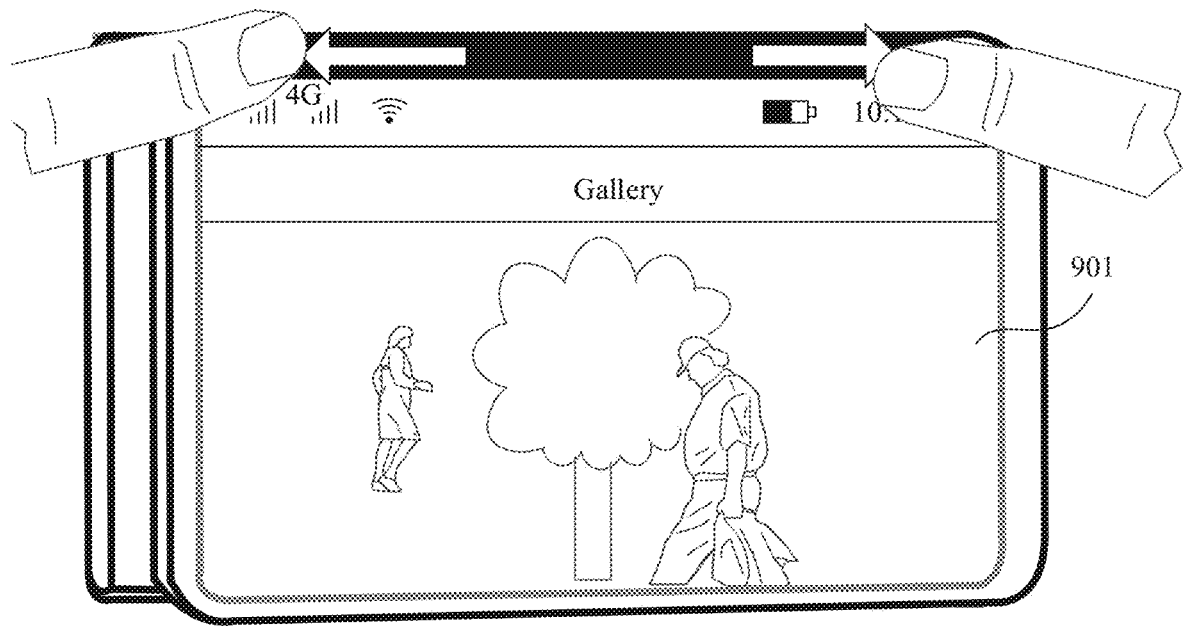
FIG. 9(a) to FIG. 9(c) are schematic diagrams of graphical user interfaces of a foldable electronic device according to an embodiment of this application.
Figure 9B:
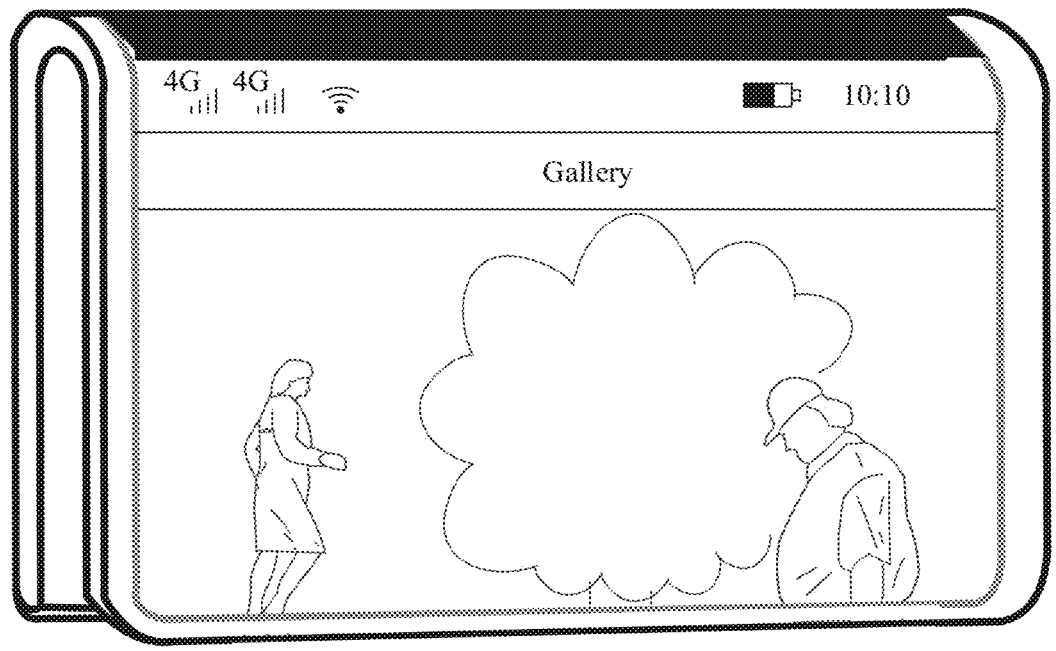
Figure 9C:
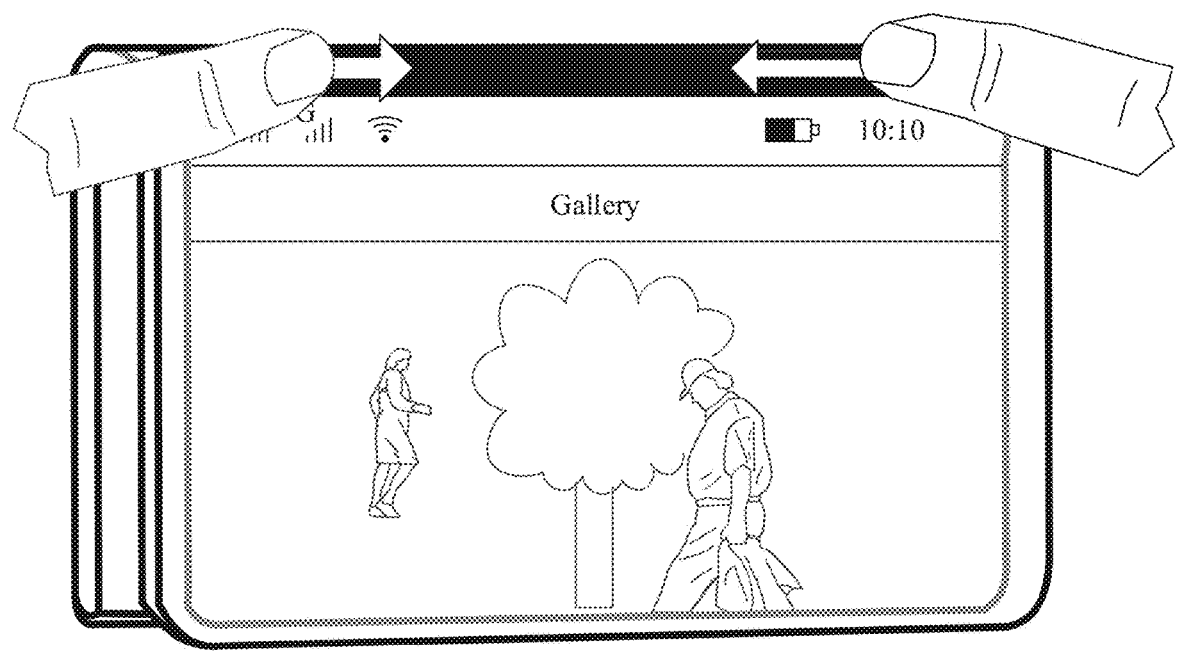

As shown in FIG. 9(a), a primary screen of an electronic device displays an image 901 from a "Gallery" application, and a secondary screen and a side screen are off. When the electronic device detects both a first left slide operation of one finger of a user on the side screen and a first right slide operation of another finger on the side screen, and the first left slide operation and the first right slide operation are operations performed from a center region of the side screen to edges, the electronic device may zoom in the image 901, as shown in FIG. 9(b). When the electronic device detects both a second left slide operation of a finger of a user on the side screen and a second right slide operation of another finger on the side screen, and the second left slide operation and the second right slide operation are slide operations performed from the edges of the side screen to the center region of the side screen, the electronic device may zoom out the image 901, as shown in FIG. 9(c).

Example 4

Figure 10A:
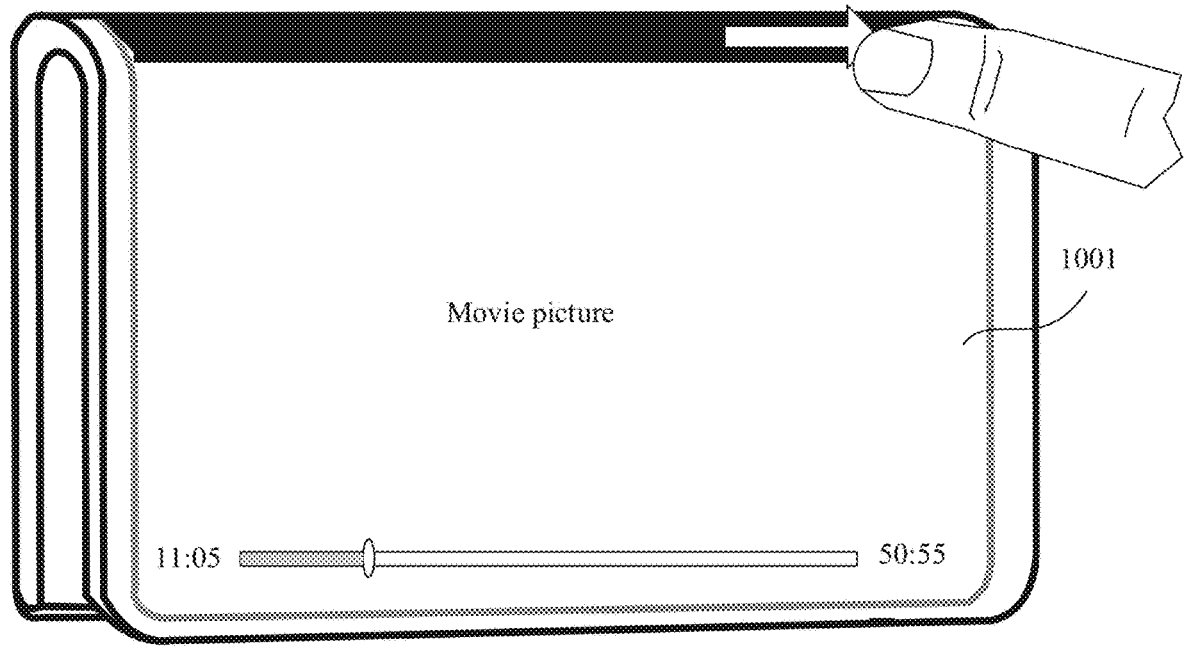
FIG. 10(a) to FIG. 10(c) are schematic diagrams of graphical user interfaces of a foldable electronic device according to an embodiment of this application.
Figure 10B:
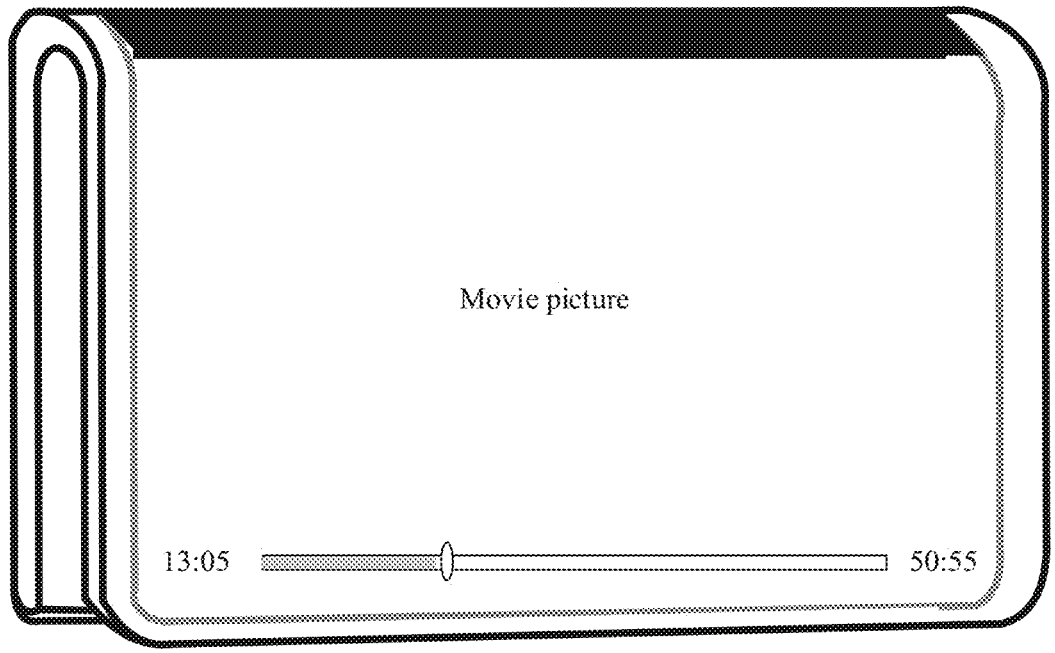
Figure 10C:
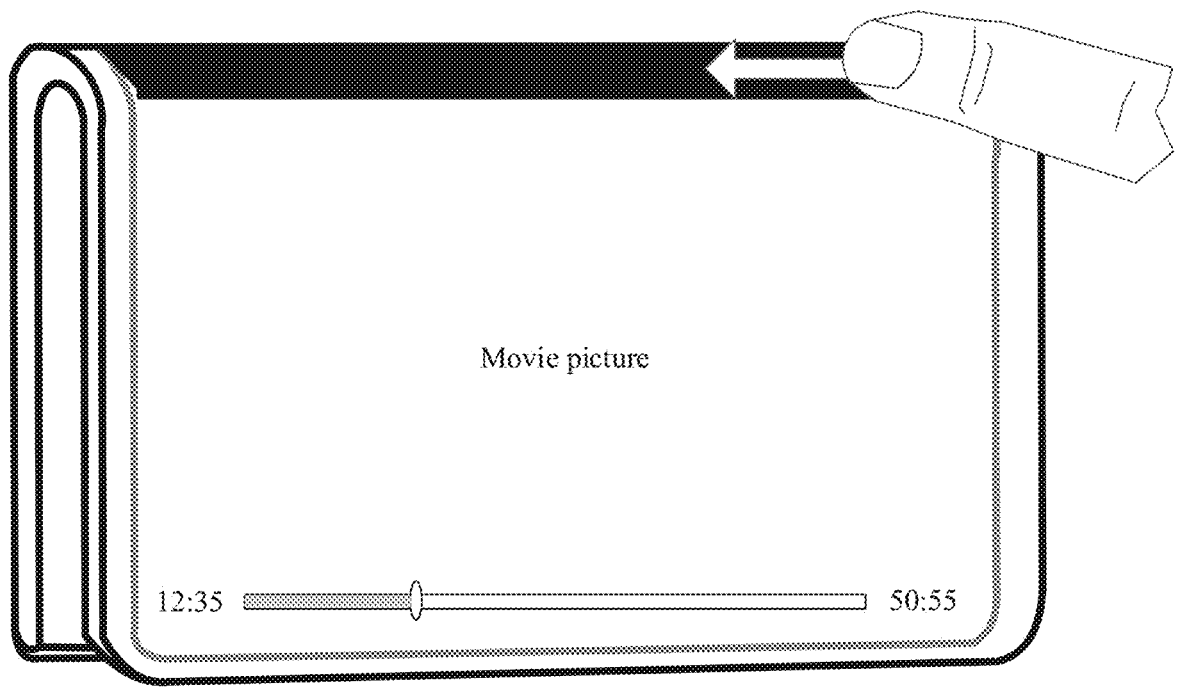

As shown in FIG. 10(a), a primary screen of an electronic device displays a playing interface 1001 of a video playing application such as an iQIYI application, where the playing interface includes a currently played movie picture; and a secondary screen and a side screen of the electronic device are off. When detecting a right slide operation performed by a user on the side screen, the electronic device may map the right slide operation to the movie playing interface, to fast-forward a movie, as shown in FIG. 10(b). When detecting a left slide operation performed by the user on the side screen, the electronic device may map the left slide operation to the movie playing interface, to rewind the movie, as shown in FIG. 10(c).

In some other examples, the user may further control the movie playing interface by performing another touch control operation on the side screen. For example, the electronic device may pause movie playing when detecting a tap/double-tap operation performed by the user on the side screen. The electronic device may continue playing the movie when detecting a tap/double-tap operation again.

In some embodiments, to facilitate the user to learn the touch control function on the side screen, the electronic device may display prompt information when starting to play the movie, where the prompt information is used to prompt the user to implement fast-forwarding, rewinding, pausing, and the like by using the side screen. The prompt information may be an image, a text, a dynamic image, a short video, or the like. This is not limited in this embodiment of this application. In some other embodiments, the electronic device may output prompt information after detecting that the user triggers fast-forward/rewind operations for a plurality of times, where the prompt information is used to prompt the user to perform fast-forwarding/rewinding/pausing on the side screen.

In other embodiments, the user may further implement page flipping (for example, page flipping of an e-book for browsing), page refreshing (for example, browsing of contacts), and the like on the primary screen of the electronic device by performing a touch control operation on the side screen. This is not enumerated herein one by one.

Scenario 2:

For example, the electronic device is in the folded form, and the primary screen displays the first interface of the first application or a home screen. If the electronic device detects the first touch control operation performed by the user on the side screen, the electronic device may adjust the display brightness, the volume of the speaker, and the like in response to the first touch control operation. For example, the electronic device increases the display brightness or the volume on the primary screen if detecting an up slide operation/a right slide operation performed by the user on the side screen; or the electronic device decreases the display brightness or the volume on the primary screen and/or the display brightness or the volume on the secondary screen if detecting a down slide operation/left slide operation performed by the user on the side screen.

In this embodiment of this application, the electronic device is in the folded form, the primary screen displays the first interface, the secondary screen and the side screen may be off, and a touch control function may be enabled for the side screen. The electronic device may map the first touch control operation on the side screen to a second touch control operation on the primary screen. In a possible implementation, the electronic device may pre-store a mapping relationship between a first display region on the side screen and a second display region on the primary screen (For example, the first display region and the second display region may be user-defined regions). The electronic device maps, based on the mapping relationship, the first touch control operation to the second touch control operation in the second display region on the primary screen after detecting the first touch control operation in the first display region on the side screen. In this embodiment, the first display region on the side screen and the second display region on the primary screen may be user-defined, or may be set by a system by default. This is not limited in this embodiment of this application. In another possible implementation, after detecting the first touch control operation in the first display region on the side screen, the electronic device may determine a second display region on the primary screen based on a coordinate conversion relationship, and then map the first touch control operation to the second touch control operation in the second display region on the primary screen. In this embodiment, the electronic device does not need to pre-store the mapping relationship between the first display region on the side screen and the second display region on the primary screen. Regardless of which region on the side screen the electronic device detects a touch control operation, the electronic device may map, based on the coordinate conversion relationship, the touch control operation to a touch control operation in a corresponding region on the primary screen. This is described in detail in the following embodiments.

In a first possible implementation, the electronic device pre-stores the mapping relationship between the first display region on the side screen and the second display region on the primary screen.

Example 1

Figure 11:
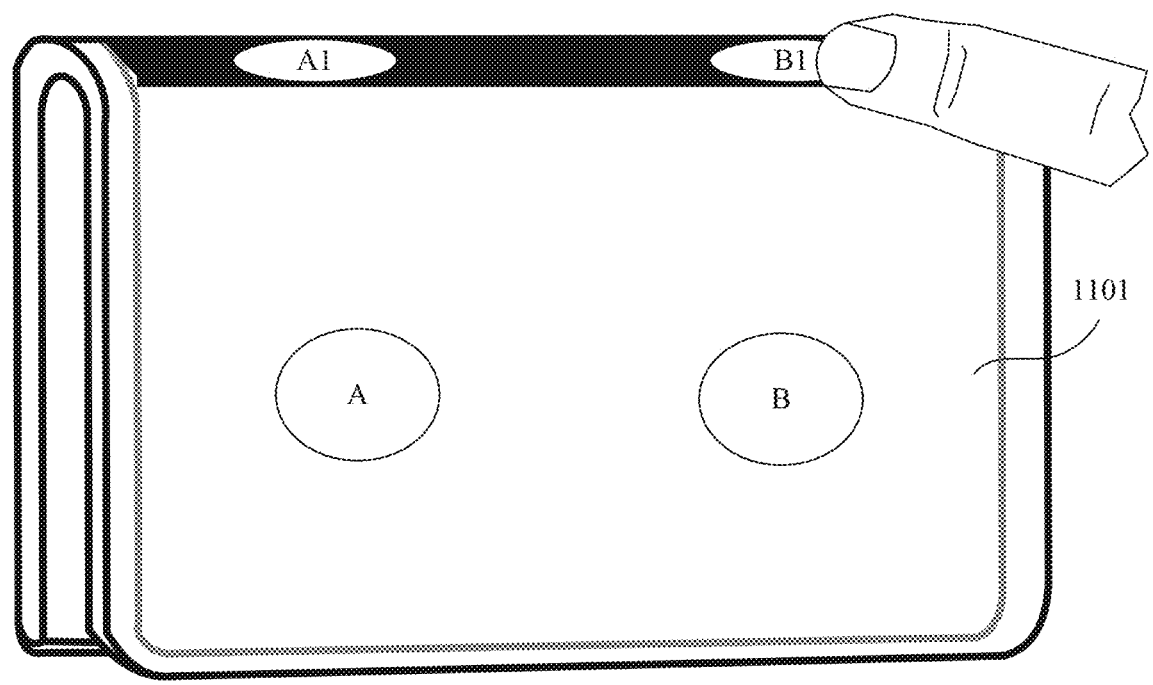
FIG. 11 is a schematic diagram of mapping between a region on a primary screen and a region on a side screen on a foldable electronic device according to an embodiment of this application.

For example, as shown in FIG. 11, a primary screen of an electronic device displays a first interface 1101. The electronic device may map a touch control function in a region A in the first interface 1101 to a region A1 on a side screen, and map a touch control function in a region B in the first interface 1101 to a region B1 on the side screen. The region A and the region B in the first interface 1101 may be user-defined, and the region A1 and the region B1 on the side screen may also be user-defined. In this way, a user can implement touch control over the region A on the primary screen by performing a touch control operation in the region A1 on the side screen, and implement touch control over the region B on the primary screen by performing a touch control operation in the region B1 on the side screen. In some embodiments, the electronic device may select a region on the side screen and a region on the primary screen for mapping by using a "Settings" application. To be specific, the user may select, by using the "Settings" application, the region A1 and the region B1 on the primary screen, and the region A and the region B on the side screen. Based on a selection of the user, the electronic device establishes a mapping relationship between the region A1 and the region A, and establishes a mapping relationship between the region B and the region B1.

Figure 12:
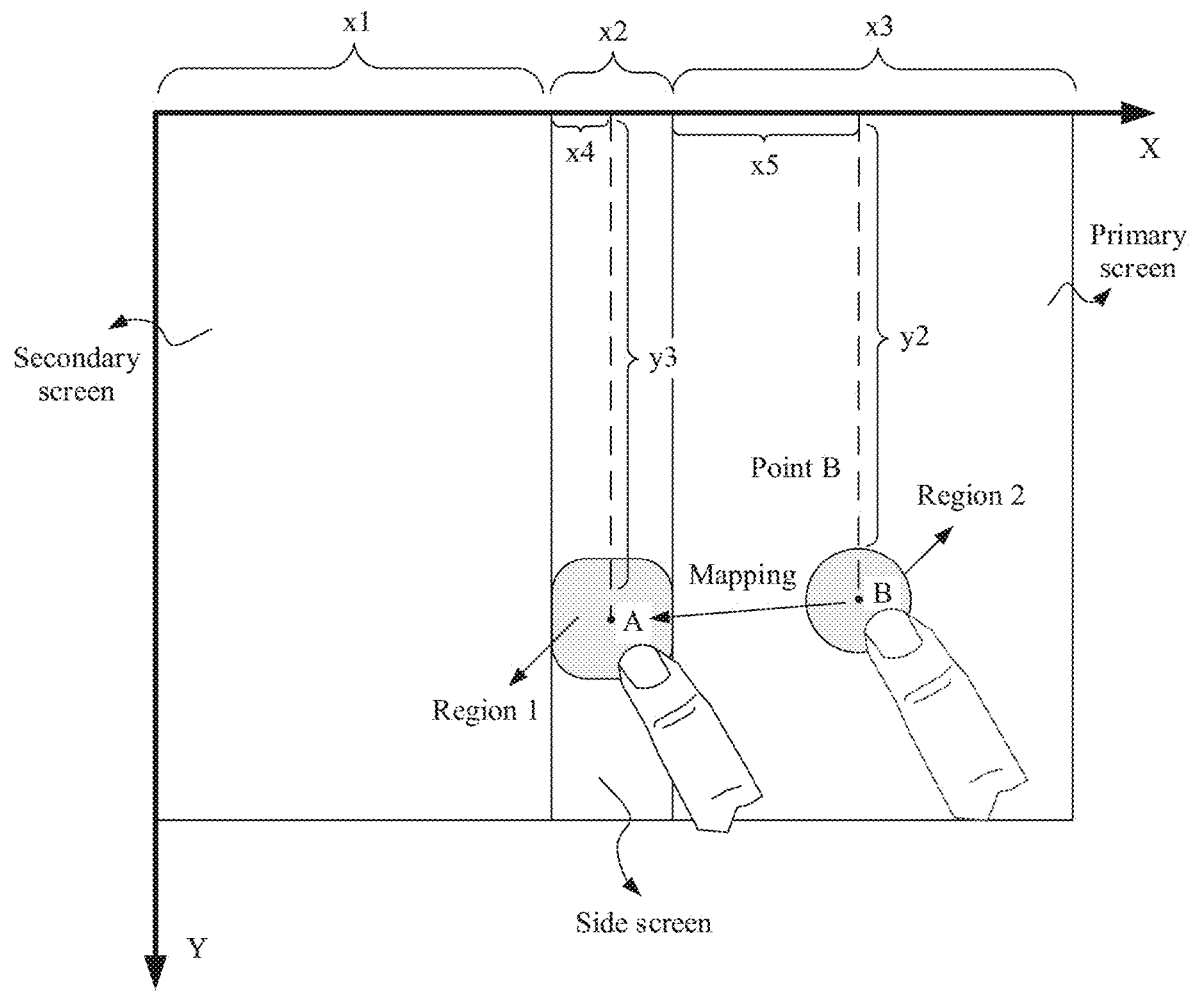
FIG. 12 is a schematic diagram of mapping a touch control region on a side screen to a touch control region on a primary screen on a foldable electronic device according to an embodiment of this application.

For example, as shown in FIG. 12, a user selects a region 2 on a primary screen, and an electronic device may store coordinates of the region 2, for example, stores coordinates (x1+x2+x5, y2) of a center point B in the region 2. The user selects a region 1 on a side screen, and the electronic device may store coordinates of the region 1, for example, stores coordinates (x1+x4, y3) of a center point A in the region 1. The electronic device may establish a mapping relationship between the point A and the point B, or the electronic device may record an area of the region 1 and an area of the region 2, and further establish a mapping relationship between the region 1 and the region 2.

In some embodiments, after the electronic device has established the mapping relationship between the region A1 and the region A, the electronic device detects an operation of establishing mapping between a region C1 on the side screen and a region C on the primary screen. However, the region C1 overlaps with the region A1. In this case, in a possible implementation, the electronic device may output prompt information, where the prompt information is used to prompt that the region C1 overlaps with the region A1 and the region C1 needs to be reselected. This can avoid a case that two overlapping regions on the side screen correspond to different regions on the primary screen. In another possible manner, if the region C1 overlaps with the region A1, the electronic device may determine whether an area of an overlapping region between the region C1 and the region A1 is larger than a preset area. If the area of the overlapping region between the region C1 and the region A1 is larger than the preset area, the electronic device outputs prompt information to prompt the user to reselect the region C1. If the area of the overlapping region between the region C1 and the region A1 is not larger than the preset area, the electronic device establishes a mapping relationship between the region C1 and the region C on the primary screen.

In some other embodiments, the electronic device detects a touch control operation performed by the user in a region D1 on the side screen, and the electronic device determines that the region D1 overlaps with the region A1. The electronic device may compare a proportion of an area of an overlapping region to an area of the region D1 with a proportion of the area of the overlapping region to an area of the region A1. If the proportion of the area of the overlapping region to the area of the region A1 is larger, the electronic device determines that a corresponding region on the primary screen is the region A. If the proportion of an area of an overlapping region to an area of the region D1 is larger, the electronic device determines that a region D (not shown in the figure) that corresponds to the region D1 and that is on the primary screen.

In a second possible implementation, after detecting the first touch control operation in the first display region on the side screen, the electronic device may determine the second display region on the primary screen based on the coordinate conversion relationship, and then map the first touch control operation to the second touch control operation in the second display region on the primary screen.

Example 1

Figure 13A:
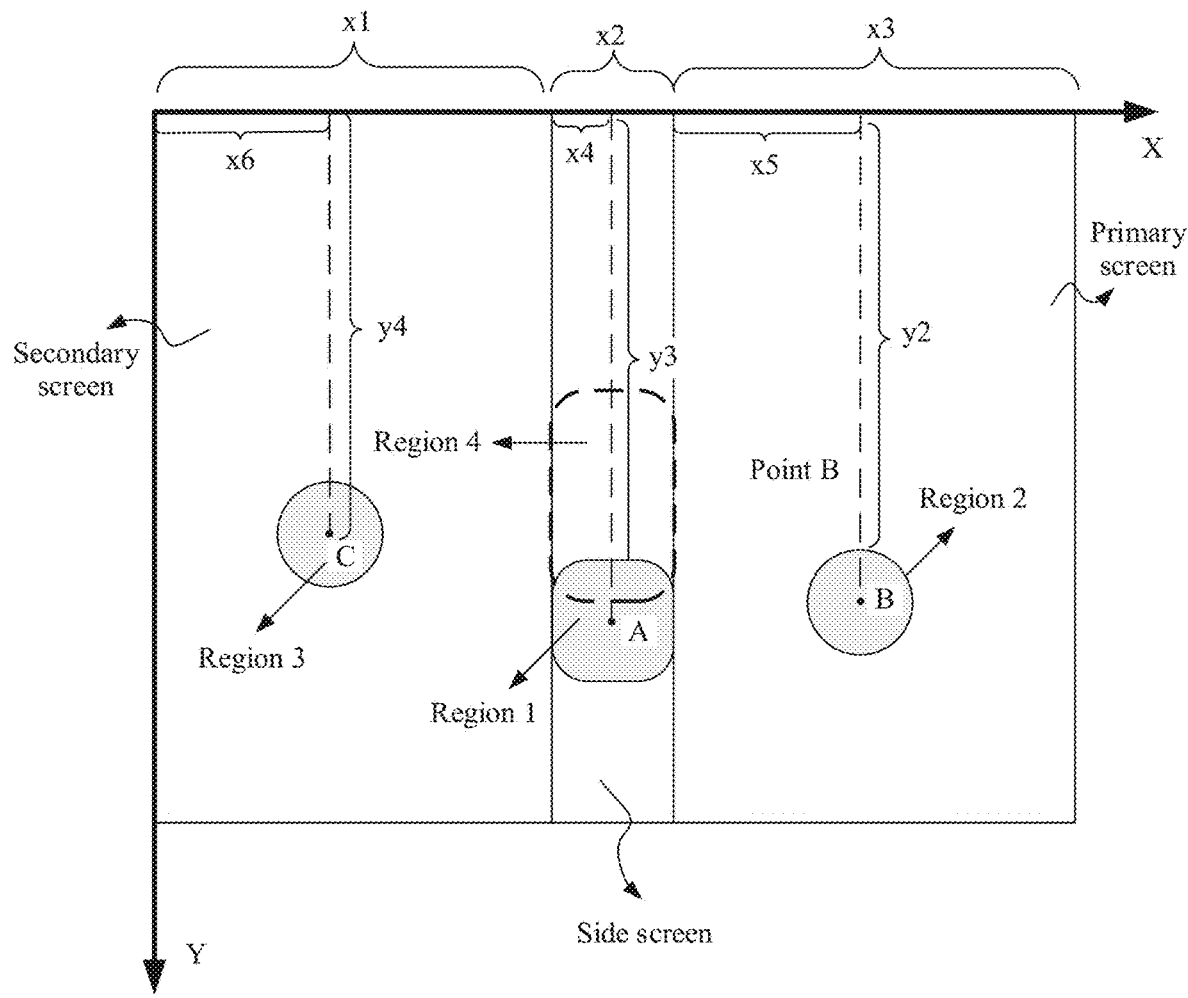
FIG. 13A is a schematic diagram of mapping a slide operation on a side screen to a slide operation on a primary screen on a foldable electronic device according to an embodiment of this application.

As shown in FIG. 13A, an electronic device constructs a coordinate system, for example, constructs a coordinate system by using a short side of the electronic device as a y axis and a long axis as an x axis. The electronic device detects a first touch control operation on a side screen, and determines location coordinates of a touch control region in which the first touch control operation is performed. It is assumed that the electronic device determines that the touch control region corresponding to the first touch control operation is a region 1 in FIG. 13A. The electronic device may determine a point in the region 1, for example, a center point A, then determine, according to a preset operation relationship, a point B corresponding to the point A on a primary screen, and then determine a region 2 based on the point B, to implement mapping between the region 1 on the side screen and the region 2 on the primary screen. For example, as shown in FIG. 13A, coordinates of the point A on the side screen are (x1+x4, y3), and coordinates of the point B may be obtained according to the following operation relationship. The operation relationship is as follows:

a horizontal coordinate of the point B: x1+x2+x4*x3/x2, where x4 is determined; and a vertical coordinate of the point B: y2=y3*K, where K is a proportion value, and may be a preset value, for example, K=1.

x1 is a width of a secondary screen, x2 is a width of the side screen, x3 is a width of the primary screen, and therefore, x1, x2, and x3 are known. After detecting the first touch control operation on the side screen, the electronic device determines the region 1 corresponding to the first touch control operation and the center point (or any other point) in the region 1 based on x4 and y3. Therefore, the coordinates of the point B on the primary screen may be obtained according to the foregoing formula. For example, the electronic device may determine a circle region by using the point B as a center and a first preset value as a radius. The circle region is the region 2. The radius may be 3 cm, 5 cm, or the like. It should be noted that a specific value of the radius is not limited in this embodiment of this application. In addition, the electronic device may further determine a region of another shape by using the point B as a reference. The region is not a circle region, but is, for example, a rectangular region or a square region. This is not limited in this embodiment of this application. Therefore, when the electronic device detects the first touch control operation in the region 1 on the side screen, the electronic device may map the first touch control operation to a second touch control operation in the region 2 on the primary screen.

Still as shown in FIG. 13A, when the electronic device maps the region 1 on the side screen to a region 3 on the secondary screen, calculation may be performed according to the following formula:

a horizontal coordinate of a point C: x6=x4*x1/x2, where x4 is determined; and a vertical coordinate of the point C: y4=K1*y3, where K1 is a proportional value, and may be a preset value, for example, K1=1, and K1 may or may not be equal to K.

Therefore, the electronic device obtains the horizontal coordinate and the vertical coordinate of the point C, and may further determine a location of the region 3. For example, the electronic device may determine a circle region by using the point C as a center and a second preset value as a radius. The circle region is the region 3. The second preset value may be the same as or different from the first preset value.

In some embodiments, as shown in FIG. 13A, when the electronic device detects a first touch control operation in a region 4 on the side screen, if the region 4 overlaps with the region 1, areas of the region 4 and the region 1 may be compared. If the area of the region 4 is larger, the electronic device determines a region 5 (not shown in the figure) that corresponds to the region 4 and that is on the primary screen, and then maps the first touch control operation to the region 5 on the primary screen. If the area of the region 1 is larger, the electronic device determines the region 2 that corresponds to the region 1 and that is on the primary screen, and then maps the first touch control operation to the region 2 on the primary screen. In some other embodiments, when the electronic device detects the first touch control operation in the region 4 on the side screen, if the electronic device determines that the region 4 and the region 1 have an overlapping region, the electronic device may determine whether a proportion of an area of the overlapping region to the area of the region 1 is larger or a proportion of the area of the overlapping region to the area of the region 4 is larger. If the electronic device determines that the proportion of the area of the overlapping region to the area of the region 1 is larger, the electronic device maps the first touch control operation to the region 2 on the primary screen based on the mapping relationship between the region 1 and the region 2 on the primary screen. If the electronic device determines that the proportion of the area of the overlapping region to the area of the region 4 is larger, the electronic device determines, based on the region 4, a region 5 (not shown in the figure) that corresponds to the region 4 and that is on the primary screen, and then maps the first touch control operation to the region 5 on the primary screen.

Example 2

Figure 13B:
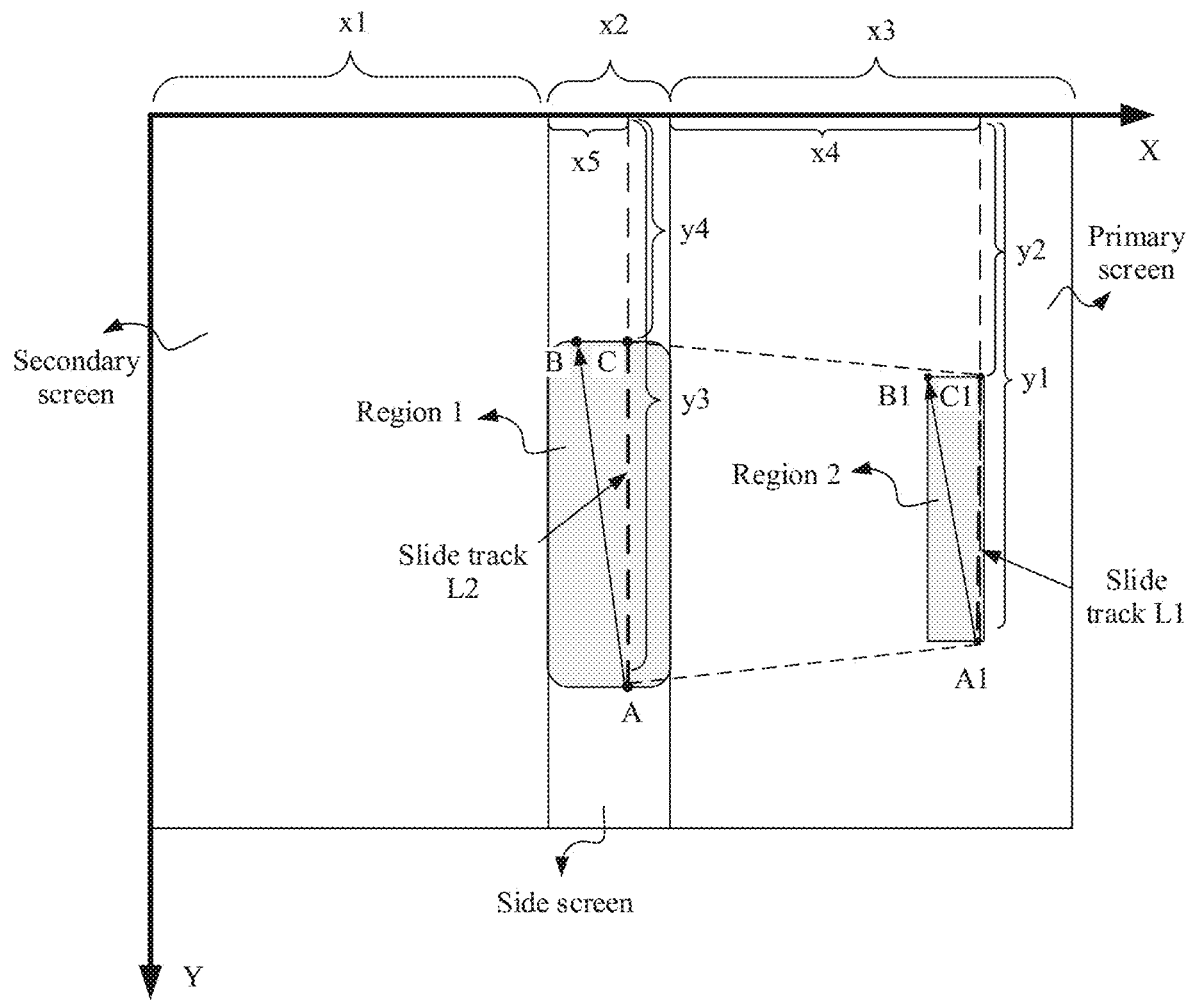
FIG. 13B is a schematic diagram of mapping a slide operation on a side screen to a slide operation on a primary screen on a foldable electronic device according to an embodiment of this application.

As shown in FIG. 13B, an electronic device may construct a coordinate system, for example, construct a coordinate system by using a short side of the electronic device as a y axis and a long axis as an x axis. After detecting a first slide operation on a side screen, the electronic device may determine a first touch control region corresponding to the first slide operation. Assuming that the first touch control region is a region 1 shown in FIG. 13B, the electronic device determines coordinates of a point A and coordinates of a point B in the region 1, for example, the point A is a start point of the first slide operation, and the point B is an end point of the first slide operation, that is, the first slide operation is a slide from the point A to the point B. The electronic device determines that there is an offset from a horizontal coordinate of the point A to a horizontal coordinate of the point B (the horizontal coordinates are different), and may correct the horizontal coordinate of the point B to that of a point C. For example, the electronic device may perform correction in a vertical direction by using the coordinates of the start point A as a reference, to obtain that coordinates of a correction point, namely, the point C, are (x1+x5, y4). Therefore, the electronic device may determine that a distance of the first slide operation on the side screen in the vertical direction is a vertical track L2 (for example, a dashed line from the point A to the point C in the figure).

The electronic device may map the point A to a point A1. A horizontal coordinate of the point A1 is x1+x2+x5*x3/x2, where x5 is determined, and a vertical coordinate of the point A1 is y1=y3*k, where k is a scaling ratio, for example, k=1. The electronic device may further determine a distance 1 between A and C, that is, y3-y4, and then calculate a distance 2 between A1 and C1, that is, (y3-y4) k1, where k1 is a scaling ratio, for example, k1 is equal to 1, and k1 may be the same as or different from k. This is not limited in this embodiment of this application.

Therefore, the electronic device obtains the coordinates of the point A1 on a primary screen and the distance 2 between A1 and C1 Then, the electronic device may determine a slide track L1 between A1 and C1 (a dashed line between A1 and C1 in FIG. 13B), and map the first slide track from A to B on the side screen to the second slide track from A1 to C1 on the primary screen. Alternatively, the electronic device may determine a rectangle by using A1 and C1 as references, for example, a region 2 in FIG. 13B, and the electronic device may establish a mapping relationship between the region 1 on the side screen and the region 2 on the primary screen.

In the foregoing embodiment, an actual operation performed by a user on the side screen is an operation from the point A to the point B, and the electronic device maps the first slide track (a tilt track) from A to B to a vertical track on the primary screen, that is, the second slide track from A1 to C1. In some other embodiments, for example, when a width of the side screen is relatively large, the electronic device may also map the track of the user from the point A to the point B on the side screen to a track from A1 to B1 on the primary screen. This is not limited in this embodiment of this application. For example, after determining the coordinates of the point A on the side screen, the electronic device may further determine an included angle between AB and AC and a distance 1 between A and B. The electronic device may map the point A to the point A1, calculate the distance 2 (namely, the distance between A1 and B1) based on a scaling ratio and the distance 1, then determine the track from A1 to B1 based on the included angle, and map the first slide track from A to B on the side screen to a second slide track from A1 to B1 on the primary screen.

In the foregoing embodiment, the electronic device establishes the mapping relationship between the first display region on the side screen and the second display region on the primary screen. In some other embodiments, the electronic device may further map a first control on the primary screen/the secondary screen to the first display region on the side screen, that is, the electronic device establishes a mapping relationship between the first display region on the side screen and the first control on the primary screen/the secondary screen.

In some embodiments, the electronic device may map a touch control function on the first control on the primary screen and/or a touch control function on the first control on the secondary screen to the first display region on the side screen. The first control on the primary screen and/or the first control on the secondary screen may be selected by the user, or may be set by a system by default. This is not limited in this embodiment of this application. The first display region on the side screen may alternatively be user-defined, or may be set by a system by default. For example, the electronic device is in a folded form, the primary screen displays the first interface of the first application, and the side screen and the secondary screen are off. The electronic device may map a touch control function on a control in the first interface to the first display region on the side screen. In an example, when a plurality of controls on the primary screen or the secondary screen need to be mapped to the side screen, each control on the primary screen may correspond to a region on the side screen. In another example, when a control on the primary screen or the secondary screen needs to be mapped to the first display region on the side screen, the first display region may be the entire region or a part of the region on the side screen. Certainly, after mapping the touch control function on the first control on the primary screen to the side screen, the electronic device may disable the touch control function on the first control on the primary screen.

For example, when the primary screen displays icons of one or more controls, the electronic device may only map the touch control function on a first control on the primary screen to the first display region (the first display region may be user-defined) on the side screen. That is, the side screen does not display an icon of the first control, but the first display region on the side screen has a touch control function. After detecting the touch control operation in the first display region on the side screen, the electronic device maps the touch control operation to an operation on an icon of the first control/a control on the primary screen and/or the first control/a control on the secondary screen.

In some embodiments, each of the one or more controls on the primary screen may correspond to a region on the side screen. For example, different regions on the side screen may display different color information. For example, a region 1 on the side screen is displayed in gray, and the region 1 corresponds to a control 1 on the primary screen; and a region 2 on the side screen is displayed in black, and the region 2 corresponds to a control 2 on the primary screen. In this way, the user can easily distinguish between mapping relationships between regions on the side screen and controls on the primary screen and/or mapping relationships between regions on the side screen and controls on the secondary screen. For example, after mapping the touch control function on the first control on the primary screen and/or the touch control function on the first control on the secondary screen to the first display region on the side screen, the electronic device may light up the first display region on the side screen, for example, light up only the first display region on the side screen, skip lighting up another region other than the first display region on the side screen.

In some other embodiments, the electronic device may map an icon of the first control/the control (one or more controls/controls) on the primary screen and/or an icon of the first control/the control (one or more controls/controls) on the secondary screen to the first display region on the side screen. The first control on the primary screen may be selected by the user, and the first display region on the side screen may also be selected by the user.

In an example, when the primary screen of the electronic device displays icons of the one or more controls, the electronic device may map a first icon of the first control on the primary screen to the side screen, that is, the side screen displays the first icon. After detecting a first operation performed by the user on the first icon on the side screen, the electronic device may map the first operation to the icon of the first control on the primary screen and/or the icon of the first control on the secondary screen.

Example 1

Figure 14A:
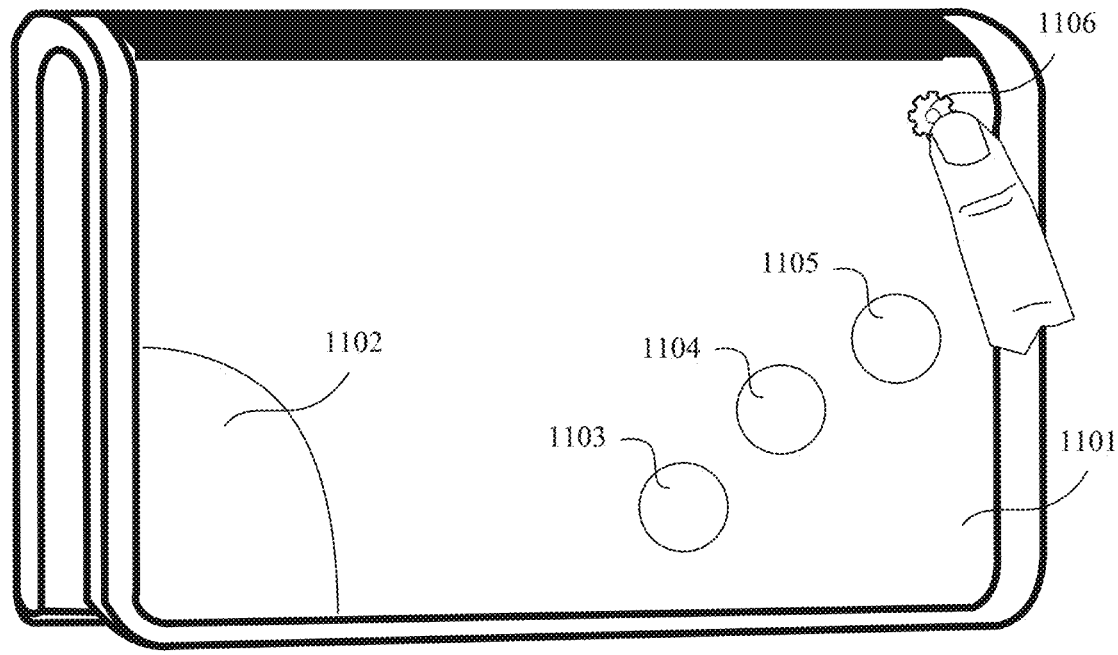
FIG. 14(a) to FIG. 14(h) are schematic diagrams of mapping a control on a primary screen to a side screen on a foldable electronic device according to an embodiment of this application.
Figure 14B:
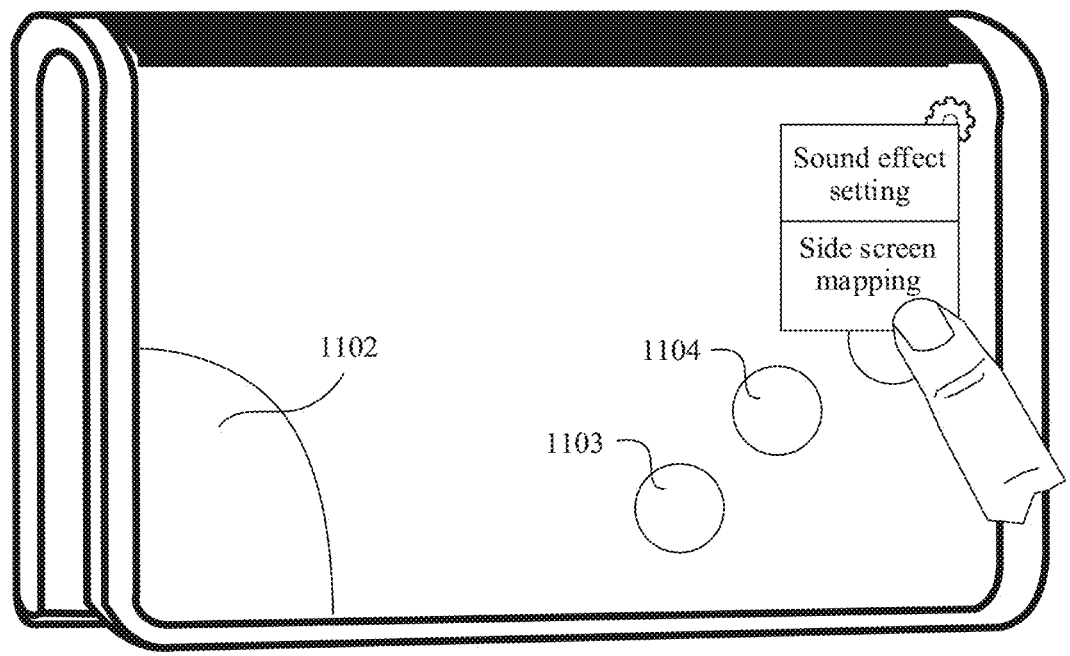
Figure 14C:
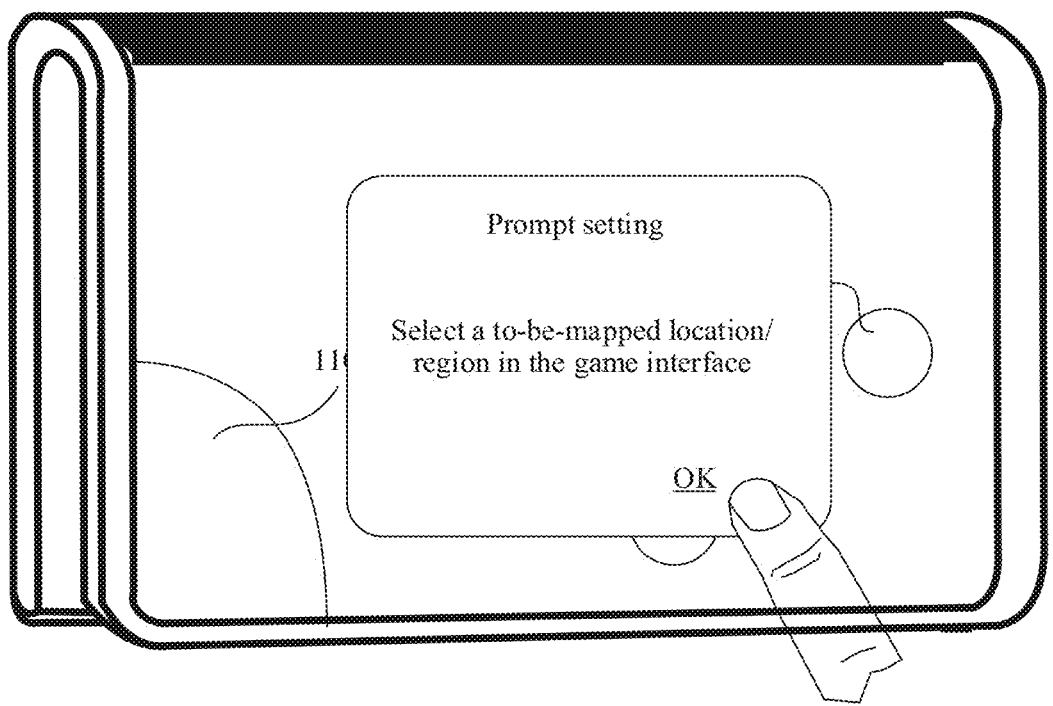
Figure 14D:
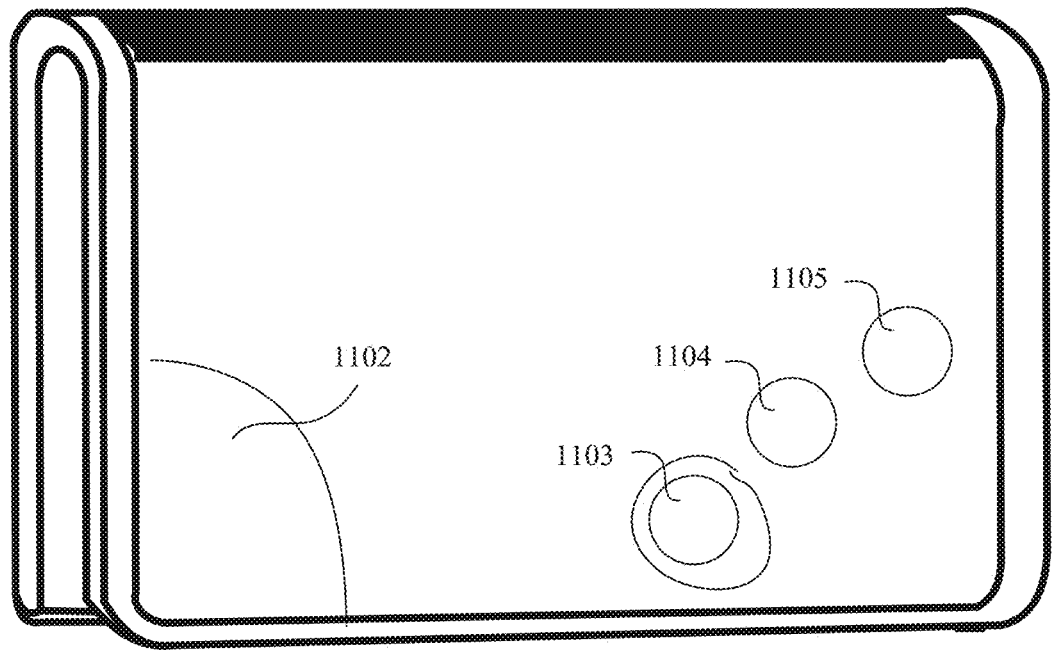

As shown in FIG. 14(a), a primary screen of an electronic device displays a game interface 1101 of a game application, for example, Arena of Valor, and the game interface 1101 includes a touch control region 1102 (for example, a game controller touch control region) and a plurality of controls, for example, a control 1103, a control 1104, and a control 1105. Each control implements a different game function. In a possible implementation, the electronic device detects an operation on a "Settings" control 1106 in the game interface 1101, and displays a plurality of options, for example, a "Sound effect setting" option and a "Side screen mapping" option, as shown in FIG. 14(b). When detecting an operation on the "Side screen mapping" option, the electronic device displays a prompt box, as shown in FIG. 14(c), where the prompt box includes prompt information "Select a to-be-mapped region/location in the game interface". When detecting an operation on an "OK" control, the electronic device hides the prompt box, as shown in FIG. 14(d). When detecting an operation of the user for selecting a control in the game interface, the electronic device may determine a to-be-mapped control in response to the operation. The operation of selecting the control in the game interface may be an operation of tapping a region in which the control is located, a circle selection operation, or the like. For example, as shown in FIG. 14(d), the electronic device detects a circle operation performed by the user in the game interface, determines that the control is the control 1103 in a region enclosed by the circle operation, and determines that the control 1103 is the control to be projected to a side screen.

Figure 14E:
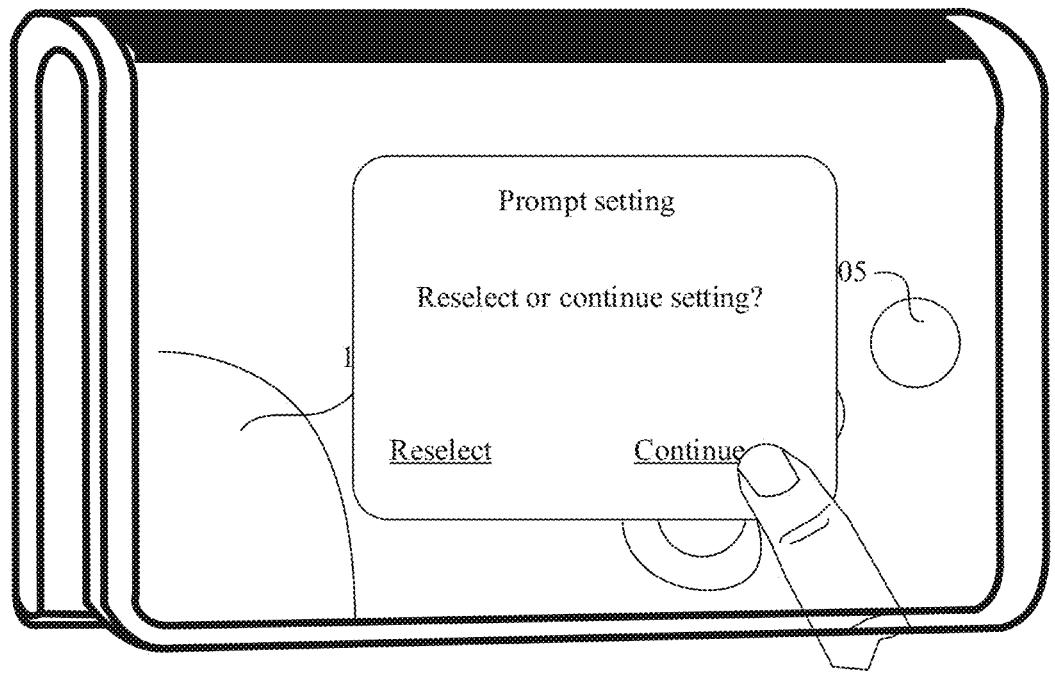
Figure 14F:
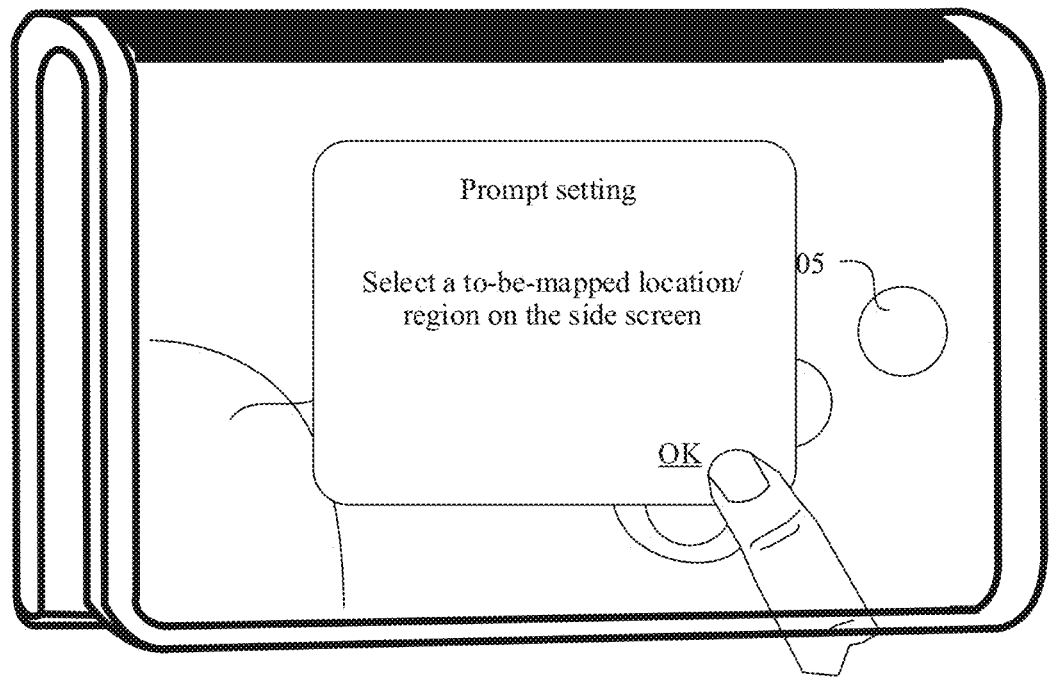
Figure 14G:
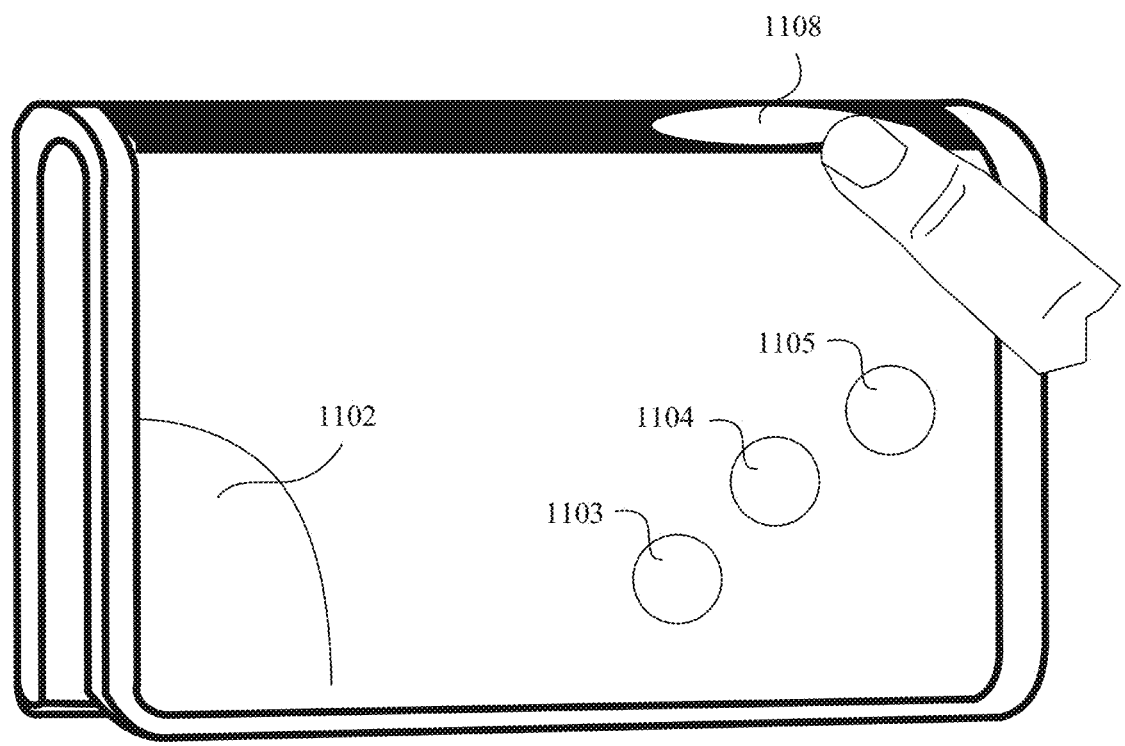
Figure 14H:
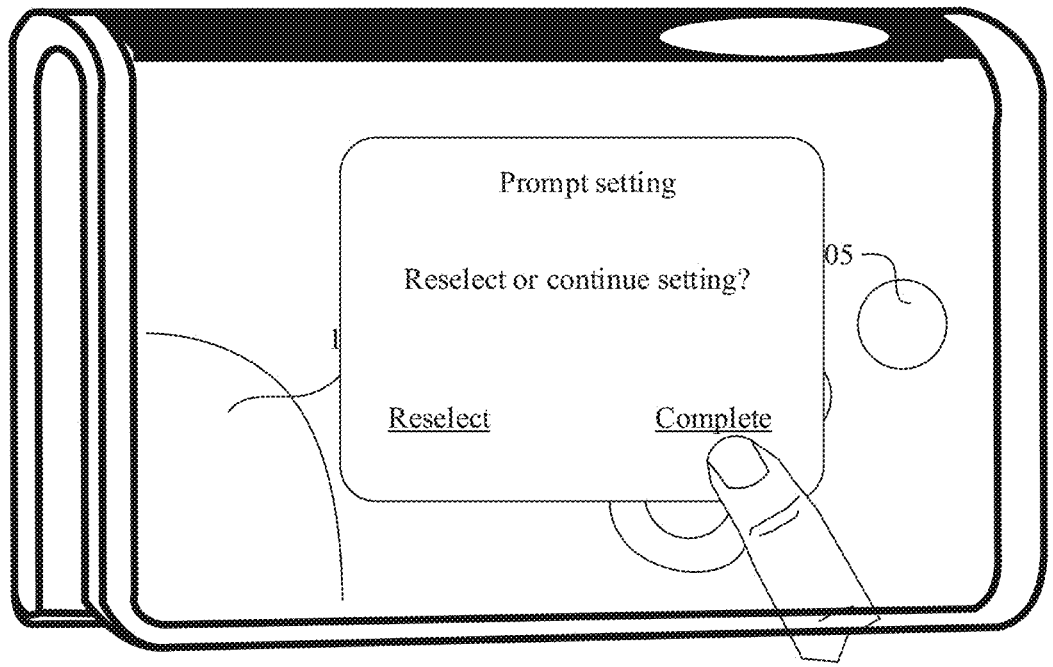

After detecting the operation of the user for selecting the control in the game interface, the electronic device may display a prompt box shown in FIG. 14(e), where the prompt box includes prompt information "Reselect or continue setting" and two controls: "Reselect" and "Continue". When the electronic device detects an operation on the "Reselect" control, the electronic device may re-determine, based on a selection operation performed by the user in the game interface, a control to be mapped to the side screen. In other words, if tapping the "Reselect" control, the user can reselect, in the game interface, a control to be mapped to the side screen. When detecting an operation on the control "Continue", the electronic device may display a prompt box shown in FIG. 14(f). As shown in FIG. 14(f), the prompt box includes prompt information "Select a projection region on the side screen". When detecting an operation on an "OK" control, the electronic device may hide the prompt box, as shown in FIG. 14(g). When detecting a touch control operation performed by the user on the side screen, the electronic device determines a region in which the touch control operation is performed, namely, a target region to be projected by the control. As shown in FIG. 14(g), after detecting an operation performed by the user in a white region 1108 on the side screen, the electronic device outputs a prompt box shown in FIG. 14(h), where the prompt box includes information "Reselect or complete setting", and two controls "Reselect" and "Complete". When detecting an operation performed on the "Reselect" control, the electronic device may re-determine a projection target region based on a touch control operation performed by the user on the side screen. When detecting an operation on the "Complete" control, the electronic device may establish a mapping relationship between the target region 1108 on the side screen and the control 1103 in the game interface. In this way, after detecting an operation performed by the user in the target region 1108 on the side screen, the electronic device can map the operation to an operation performed on the control 1103 in the game interface. For example, the operation is an operation such as a tap operation/a double-tap operation/a touch and hold operation.

In some embodiments, after establishing the mapping relationship between the control 1103 in the game interface and the target region 1108 on the side screen, the electronic device may cancel display of the control 1103 in the game interface, or disable a touch control function on the control 1103 in the game interface. In some other embodiments, after establishing the mapping relationship between the control 1103 in the game interface and the target region 1108 on the side screen, the electronic device may display an icon of the control 1103 in the target region 1108 on the side screen.

Example 2

Figure 15A:
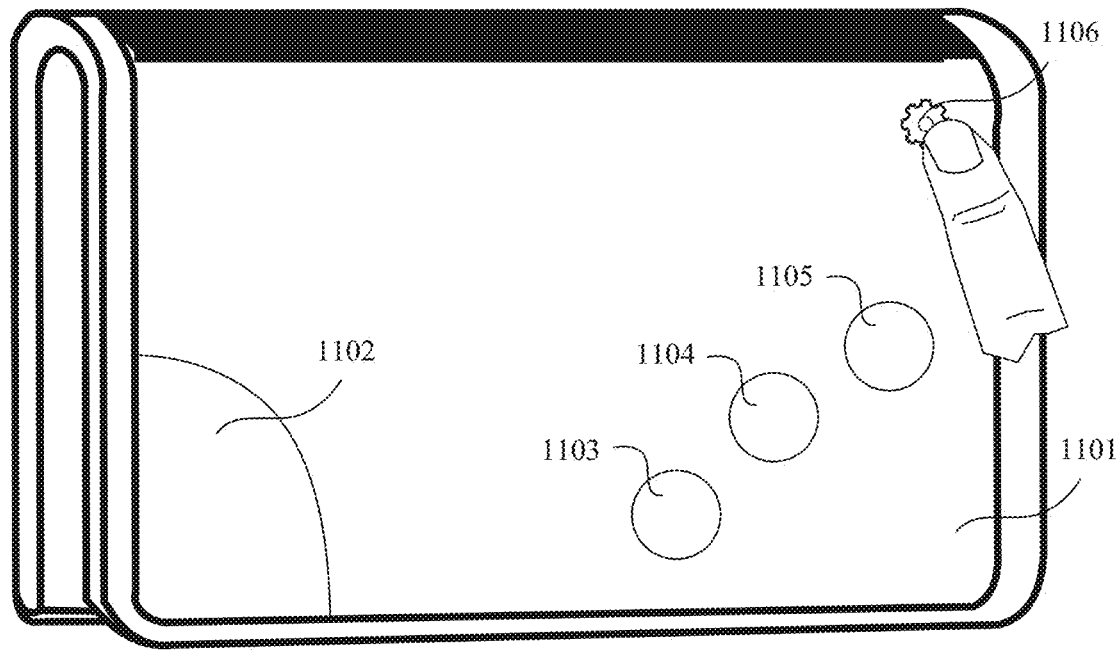
FIG. 15(a) to FIG. 15(d) are schematic diagrams of mapping a control on a primary screen to a side screen on a foldable electronic device according to an embodiment of this application.
Figure 15B:
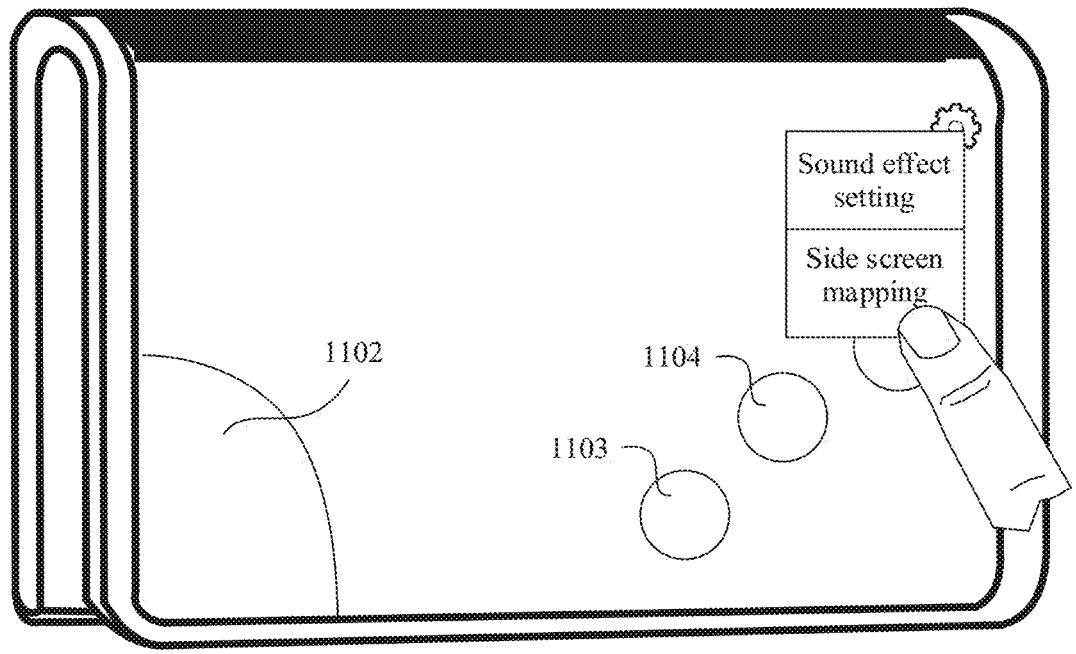
Figure 15C:
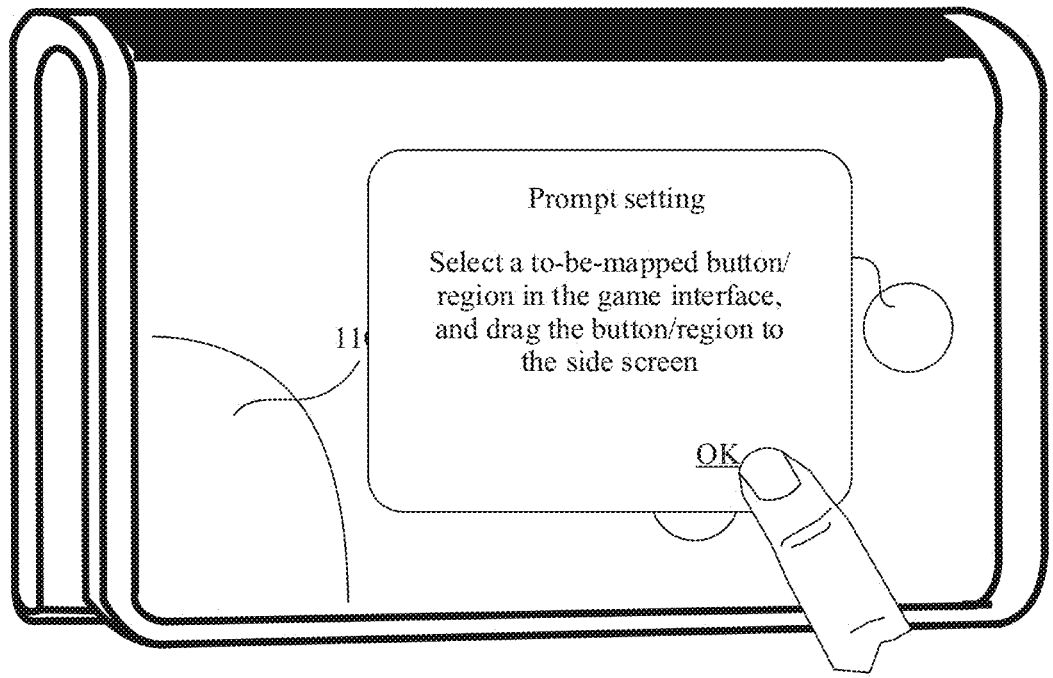

As shown in FIG. 15(a), a primary screen of an electronic device displays a game interface 1101, and the game interface 1101 includes a touch control region 1102 and a plurality of controls, for example, a control 1103, a control 1104, and a control 1105. Each control implements a different function. In a possible implementation, the electronic device detects an operation on a "Settings" control 1106 in the game interface 1101, and displays a plurality of options, for example, a "Sound effect setting" option and a "Side screen mapping" option, as shown in FIG. 15(b). When detecting an operation on the "Side screen mapping" option, the electronic device displays a prompt box, as shown in FIG. 15(c), where the prompt box includes prompt information "Select an icon of a to-be-mapped control in the game interface, and drag the icon to the side screen".

Figure 15D:
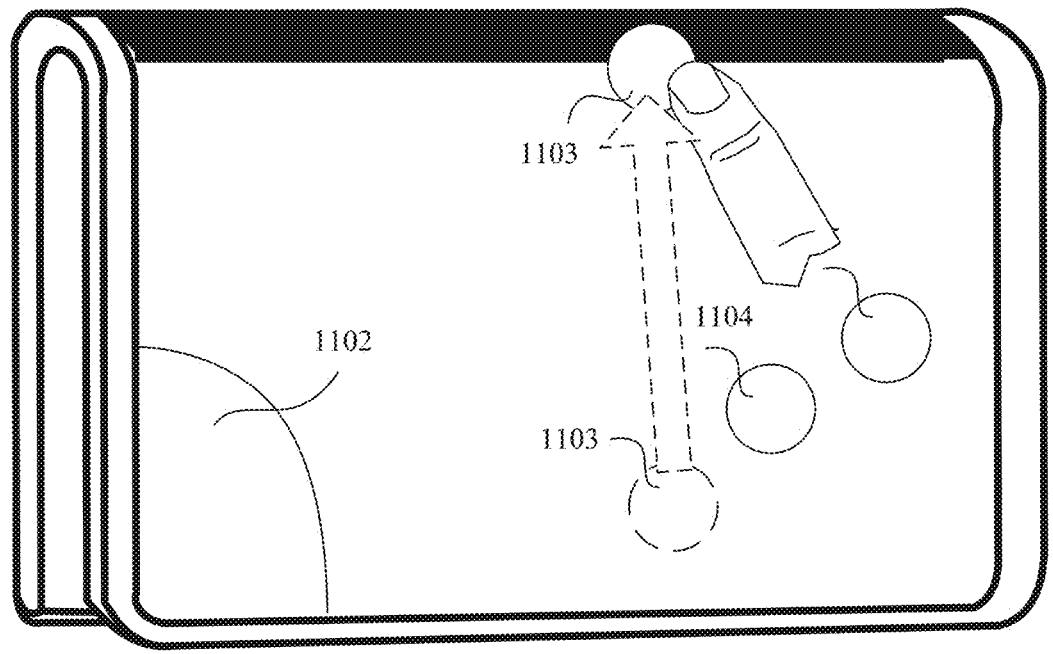

In a possible implementation, as shown in FIG. 15(d), when detecting that an icon of the control 1103 is dragged to the side screen, the electronic device may hide the icon of the control 1103 in the game interface, and display the icon of the control 1103 on the side screen. The icon of the control 1103 displayed on the side screen may be the same as or different from the icon of the control 1103 in the game interface. Alternatively, the electronic device may light only a region in which the control 1103 on the side screen is located. The region is a region to which the icon of the control 1103 is dragged on the side screen. In another possible case, when detecting that the icon of the control 1103 is dragged to the side screen, the electronic device still displays the icon of the control 1103 in the game interface, but disables a touch control function on the control 1103.

Example 1 and Example 2 illustrate that the electronic device maps, based on a selection of the user, a control selected by the user on the primary screen to the side screen. In some other embodiments, the electronic device may further autonomously select which controls on the primary screen are mapped to the side screen, and the user does not need to perform the selection. In an example, the primary screen of the electronic device displays the first interface. The electronic device may determine, in the first interface, a control for which a quantity of taps is maximum, minimum, greater than or equal to a first preset quantity, or less than or equal to a second preset quantity, and map the control to the side screen. Alternatively, the electronic device may determine a control that has a largest area in the first interface on the primary screen, and map the control to the side screen, so that the control does not block the first interface. In some embodiments, after automatically mapping controls in the first interface to the side screen, the electronic device may output prompt information, where the prompt information is used to notify the user which controls in the first interface are mapped to the side screen.

In the foregoing embodiment, the electronic device may map one region on the side screen to one region/control on the primary screen in an association manner. In other words, a plurality of regions on the side screen and a plurality of regions/controls on the primary screen are mapped in a one-to-one association manner. In some other embodiments, the electronic device may map one region on the side screen to a plurality of regions/controls on the primary screen in an association manner. In this case, when detecting an operation performed by the user on the region on the side screen, the electronic device may map the operation to the plurality of regions/controls on the primary screen, to implement simultaneous operations on the plurality of regions/controls on the primary screen. Therefore, the user performs an operation in one region on the side screen, to implement simultaneous operations on the plurality of regions/controls on the primary screen. In some other embodiments, the electronic device may map a plurality of regions on the side screen to one region/control on the primary screen in an association manner. In this case, when detecting an operation performed by the user on any one of the plurality of regions on the side screen, the electronic device may map the operation to the same region/control on the primary screen, to implement an operation on the region/control on the primary screen.

It should be noted that, in the foregoing embodiment, mapping between the primary screen and the side screen is used as an example. In actual application, mapping between the secondary screen and the side screen may also be performed in a same manner, and details are not described herein again.

In some embodiments, the electronic device may enable or disable a touch control mapping function for the side screen. Only after the electronic device enables the touch control mapping function for the side screen, the user can perform a touch control operation on the side screen, to control display content on the primary screen/the secondary screen of the electronic device. After the electronic device disables the touch control mapping function for the side screen, the primary screen/the secondary screen of the electronic device does not make a response when the user performs a touch control operation on the side screen. For example, when detecting that the electronic device meets a specific condition, the electronic device may enable the touch control mapping function for the side screen. The following embodiments describe several examples.

Example 1: The electronic device automatically enables the touch control mapping function for the side screen when detecting that the electronic device is switched from an unfolded form to a folded form For example, when an included angle of the electronic device changes from 180 degrees to 0 degrees, or when a physical form of the electronic device changes from the semi-folded form shown in FIG. 5(c) to the folded form shown in FIG. 5(d), the electronic device automatically enables the touch control mapping function for the side screen.

Example 2: The electronic device may automatically enable the touch control mapping function for the side screen when detecting that the first interface of the first application is displayed in a full screen manner on the primary screen or the secondary screen. For example, when the electronic device is in a semi-folded form or an unfolded form, the first interface of the first application is displayed in a full screen manner on the primary screen, and the secondary screen and the side screen are off. In this case, the electronic device may automatically enable the touch control mapping function for the side screen. For another example, when the electronic device is in an unfolded form, and the first interface of the first application is displayed in a full screen manner on the primary screen, the electronic device may automatically enable the touch control mapping function for the secondary screen, that is, map a touch control operation on the secondary screen to the primary screen. In other words, in the unfolded form, the user can operate the secondary screen, to implement an operation on the primary screen.

In some embodiments, the first application may be a preset application, or any one or more applications in all applications on the electronic device. The preset application may be one or more applications specified by the user, may be one or more applications that are set by default after delivery of the electronic device, or may be one or more applications determined by the electronic device according to a use habit of the user. For example, the preset application may be one or more applications determined by the electronic device and frequently used by the user, or may be one or more applications belonging to a specific application type, for example, a game application, a video application, or an audio application. This is not limited in this embodiment of this application. In some other embodiments, the first interface of the first application may alternatively be a home screen (or a home), a leftmost screen, or the like of the foldable electronic device.

It should be noted that in this embodiment of this application, because controls, touch control regions, and the like included in display interfaces of all the applications are different, side screen mapping functions for different applications may be different. For example, in most cases, display interfaces of some applications display controls, for example. WeChat, whereas display interfaces of some applications are touch control regions, for example, iQIYI. Therefore, for different applications, mapping relationships between touch control regions on the side screen and touch control regions on the primary screen may be different. In some other embodiments, because controls and touch control regions included in different interfaces of a same application are different, side screen mapping functions for the different interfaces of the same application may also be different. For example, controls and touch control regions included in Moments of WeChat and a chat interface of WeChat are different. Therefore, for the different interfaces of the same application, mapping relationships between touch control regions on the side screen and touch control regions on the primary screen may also be different. Therefore, when detecting that the first interface of the first application is displayed in a full screen manner on the primary screen or on the secondary screen, the electronic device may automatically enable the touch control mapping function for the side screen corresponding to the first application, or enable the touch control mapping function for the side screen corresponding to the first interface of the first application.

In some embodiments, the first interface of the first application displayed in a full screen manner on the primary screen may be the first interface of the first application displayed in an entire region that is on the primary screen and that may be used to display an application interface. For example, there is a status bar and a navigation bar on the primary screen. When the status bar on the primary screen cannot be hidden, but the navigation bar can be hidden, the first interface of the first application displayed in a full screen manner on the primary screen is the first interface of the first application displayed in an entire display region on the primary screen except a region for the status bar. For another example, when neither the status bar nor the navigation bar on the primary screen cannot be hidden, the first interface of the first application displayed in a full screen manner on the primary screen is the first interface of the first application displayed in an entire display region on the primary screen except regions for the status bar and the navigation bar. For another example, when both the status bar and the navigation bar on the primary screen can be hidden, the first interface of the first application displayed in a full screen manner on the primary screen is the first interface of the first application displayed in an entire display region (including regions for the status bar and the navigation bar) on the primary screen.

Example 3: The electronic device enables the touch control mapping function for the side screen when detecting that the electronic device is in a first holding state, or the electronic device enables the touch control mapping function for the side screen after detecting that the electronic device is in a first holding state and maintains in the first holding state for preset duration.

Figure 16:
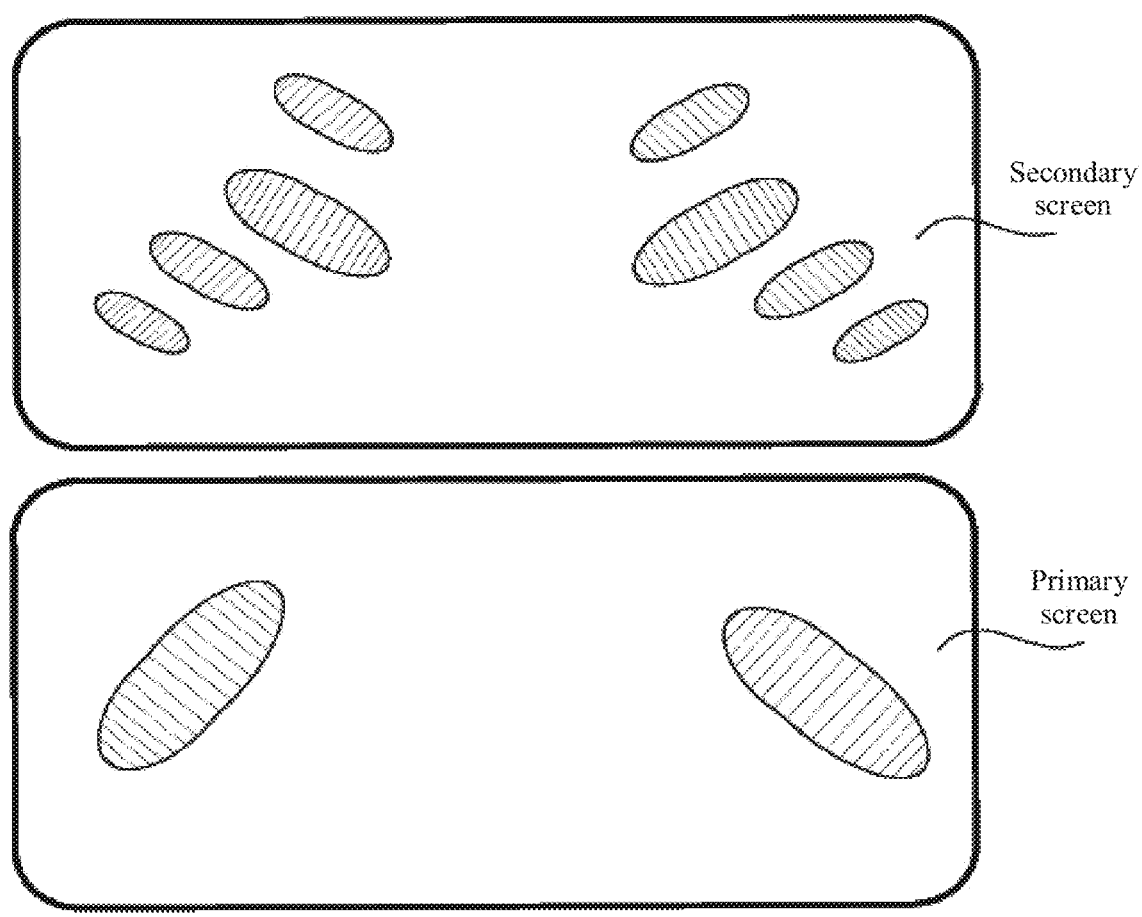
FIG. 16 is a schematic diagram of fingerprints detected on a primary screen and a secondary screen of a foldable electronic device according to an embodiment of this application.

For example, the first holding state may be the holding state shown in FIG. 6(a) or in FIG. 6(b). In some embodiments, the electronic device may determine the holding state based on fingerprints detected on the primary screen and the secondary screen. For example, as shown in FIG. 16, if a foldable electronic device detects two fingerprints on a primary screen, and detects eight fingerprints on a secondary screen, it is determined that the foldable electronic device is in a first holding state.

Example 4: When the electronic device does not enable the touch control mapping function for the side screen, if the electronic device receives a plurality of touch control operations performed by the user on the primary screen/the secondary screen, the electronic device may output prompt information, to prompt the user to enable the touch control mapping function for the side screen. For example, when the electronic device displays an interface of a game application in a full screen manner on the primary screen, if the electronic device detects that a quantity of times of touch control operations performed by the user in the interface is greater than a preset quantity of times, the electronic device may output prompt information, where the prompt information is used to prompt the user to set the touch control mapping function for the side screen.

Example 5: The touch control mapping function may be provided and enabled for the side screen before delivery of the electronic device, or may be enabled through setting performed by the user. For example, the user may enable the touch control mapping function for the side screen by using a "Setting" application in the electronic device.

It should be noted that the foregoing embodiments are merely examples of trigger conditions for the electronic device to enable the touch control mapping function for the side screen. In actual application, the foregoing different examples may be used in combination. This is not limited in this embodiment of this application. The electronic device may implement touch control over the primary screen/the secondary screen by using the side screen after enabling the touch control mapping function for the side screen.

Figure 17:
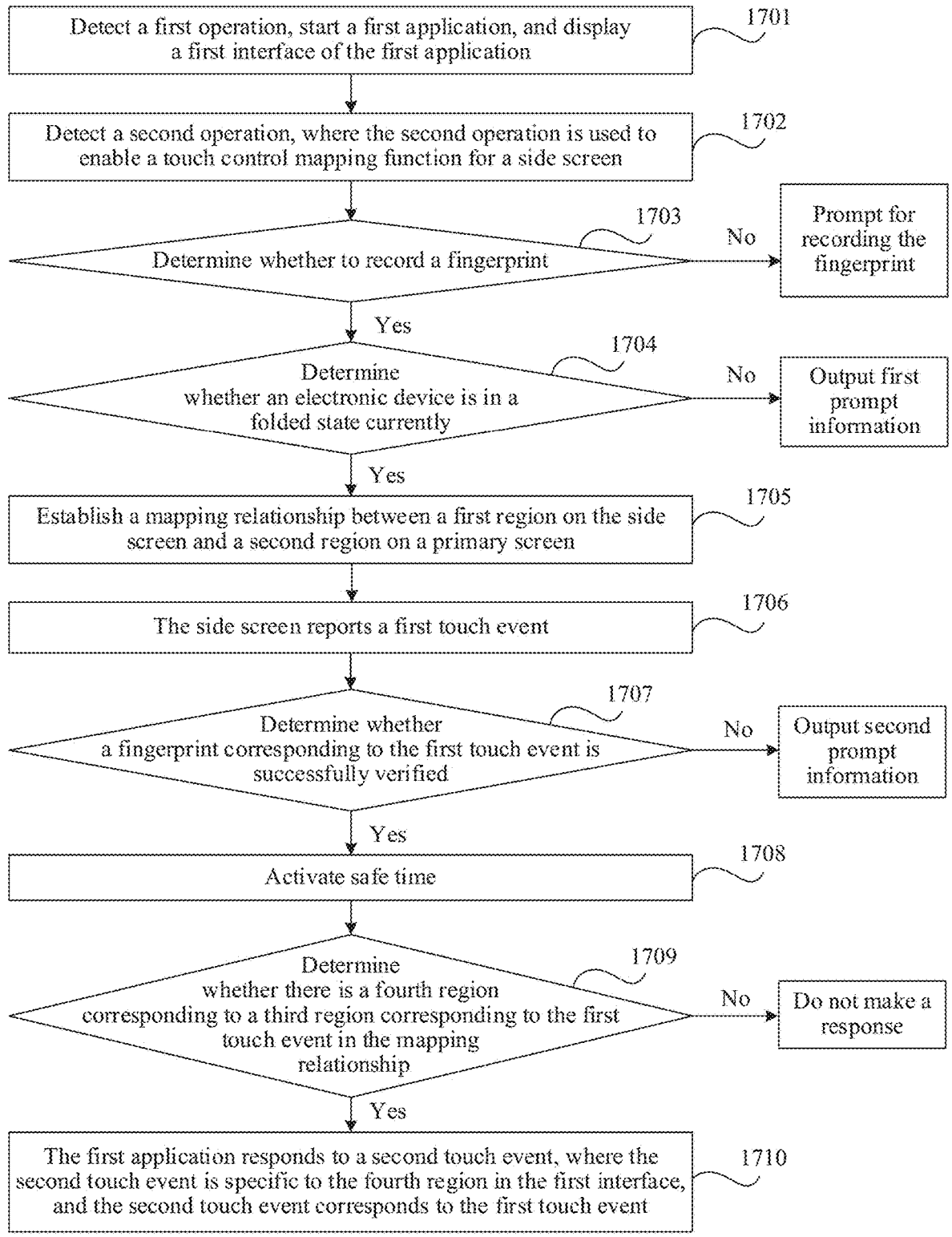
FIG. 17 is a schematic flowchart of a touch control method for a foldable electronic device according to an embodiment of this application.

FIG. 17 is a flowchart of a touch control method according to an embodiment of this application. As shown in FIG. 17, the method includes the following steps.

1701: Detect a first operation, start a first application, and display a first interface of the first application.

It should be understood that the first application may be any application of an electronic device, for example, WeChat, Weibo, or iQIYI. This is not limited in this embodiment of this application.

1702: Detect a second operation, where the second operation is used to enable a touch control mapping function for a side screen.

1703: Determine whether to record a fingerprint; and if yes, perform 1704: or if no, prompt to record the fingerprint.

In some embodiments, to improve device security, the electronic device may record a fingerprint of a user before enabling the touch control mapping function for the side screen. If the fingerprint of the user is consistent with a pre-stored fingerprint (a fingerprint of a user to which the electronic device belongs), the electronic device enables the touch control mapping function for the side screen.

1704: Determine whether the electronic device is in a folded form currently; and if the electronic device is in the folded form currently, perform 1705: or if the electronic device is not in a folded form currently, output first prompt information, where the first prompt information is used to notify the user that the electronic device is in an unfolded form currently and cannot enable the touch control mapping function for the side screen.

1705: The electronic device establishes, based on a user operation, a mapping relationship between a first display region on the side screen and a second display region on the primary screen.

For a process in which the electronic device establishes the mapping relationship between the first display region on the side screen and the second display region on the primary screen, refer to the foregoing embodiment. Details are not described herein again.

1706: The side screen reports a first touch event.

1707: Determine whether a fingerprint corresponding to the first touch event is successfully verified, and if the fingerprint corresponding to the first touch event is successfully verified, perform 1708: or if the fingerprint corresponding to the first touch event fails to be verified, output second prompt information, where the second prompt information is used to notify the user that the fingerprint verification fails.

1708: Activate safe time.

In some embodiments, the electronic device detects the first touch event on the side screen, and the electronic device may activate the safe time after the fingerprint corresponding to the first touch event is successfully verified. The electronic device does not need to verify a fingerprint if detecting another touch event on the side screen within the safe time, and the electronic device needs to verify a fingerprint again if detecting another touch event on the side screen beyond the security time. This helps improve device security.

1709: Determine whether there is a fourth region corresponding to a third display region corresponding to the first touch event in the mapping relationship; and if there is the fourth region corresponding to the third display region corresponding to the first touch event in the mapping relationship, perform 1710, or if there is no fourth region corresponding to the third display region corresponding to the first touch event in the mapping relationship, do not make response.

1710: The first application responds to a second touch event, where the second touch event is specific to the fourth region in the first interface, and the second touch event corresponds to the first touch event.

For example, the electronic device detects the first touch event on the side screen, and maps the first touch event to the second touch event on a primary screen or a secondary screen, to appropriately utilize the side screen.

The foregoing implementations of the embodiments of this application may be randomly combined to implement different technical effects.

Figure 18:
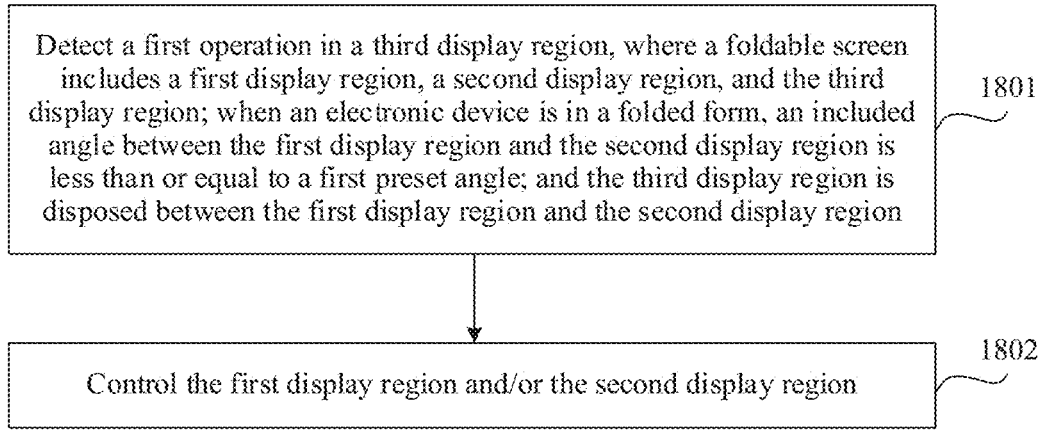
FIG. 18 is a schematic flowchart of a touch control method for a foldable electronic device according to an embodiment of this application.

With reference to the foregoing embodiments and related accompanying drawings, an embodiment of this application provides a touch control method. The method may be implemented by an electronic device having a foldable screen (for example, a mobile phone having a foldable screen, or a tablet computer having a foldable screen). For example, a structure of the electronic device may be shown in FIG. 1, FIG. 2, FIG. 3(a) to FIG. 3(d), and/or FIG. 5(a) to FIG. 5(d). For example, in FIG. 5(a) to FIG. 5(d), the foldable screen includes a first display region, a second display region, and a third display region. When the electronic device is in a folded form, an included angle between the first display region and the second display region is less than or equal to a first preset angle. The third display region is disposed between the first display region and the second display region. As shown in FIG. 18, the method may include the following steps.

1801: Detect a first operation in the third display region.

For example, when the electronic device is in the folded form, the third display region is a side screen, and the first operation may include any one of a tap operation, a double-tap operation, a touch and hold operation, a slide operation, or a hold and slide operation.

1802: Control the first display region and/or the second display region.

For example, controlling the first display region and/or the second display region may be updating a display interface in the first display region and/or a display interface in the second display region, or controlling functions in the first display region and the second display region.

For example, the electronic device may control the first display region and/or the second display region based on an orientation. For example, the electronic device controls the first display region when determining that the first display region faces a user; or the electronic device controls the second display region when determining that the second display region faces the user. There may be a plurality of manners for the electronic device to determine which a display region faces the user.

For example, the electronic device controls the first display region when determining that a first touch area of the first display region is smaller than a second touch area of the second display region; or the electronic device controls the second display region when determining that the first touch area of the first display region is larger than the second touch area of the second display region. For example, as shown in FIG. 6(*b*), the electronic device is in the folded form, and the user holds the electronic device. When a contact area between the user and the secondary screen is greater than a contact area between the user and the primary screen, the electronic device may determine that the primary screen faces the user.

For another example, the electronic device controls the first display region when determining that a first distance between the second display region and the user is longer than a second distance between the first display region and the user; or the electronic device controls the second display region when determining that a second distance between the second display region and the user is shorter than a second distance between the first display region and the user. For example, a first sensor may be disposed on a first screen on which the first display region of the electronic device is located, and a second sensor may be disposed on a second screen on which the second display region of the electronic device is located. The first sensor may detect the first distance between the user and the first display region. The second sensor may detect the second distance between the user and the second display region. If the first distance is longer than the second distance, the first display region is farther from the user, the second display region is closer to the user, and it indicates that the second display region faces the user. If the first distance is shorter than the second distance, the first display region is closer to the user, the second display region is farther from the user, and it indicates that the first display region faces the user. The first sensor may be a distance sensor, an infrared sensor, or the like, and the second sensor may also be a distance sensor, an infrared sensor, or the like.

For another example, the electronic device controls the first display region when determining that an image captured by a first camera on a first screen on which the first display region is located includes a user-specific feature (for example, a face, eyes, skin, or clothing); or the electronic device controls the second display region when determining that an image captured by a second camera on a second screen on which the second display region is located includes a user-specific feature (for example, a face, eyes, skin, or clothing). For example, the first camera may be disposed on the first screen on which the first display region of the electronic device is located, and the second camera may be disposed on the second screen on which the second display region of the electronic device is located. The first camera may capture a first image. If the first image includes a face, the first display region faces the user. The second camera captures a second image. If the second image includes a face, the second display region faces the user. Alternatively, when the first image captured by the first camera includes a face, and the second image captured by the second camera does not include a face, the electronic device determines that the first display region faces the user; or when the second image captured by the second camera includes a face, and the first image captured by the first camera includes a face, the electronic device determines that the second display region faces the user.

For another example, the electronic device controls the first display region when determining that the first display region is screen-on and the second display region is screen-off; or the electronic device controls the second display region when determining that the first display region is screen-off and the second display region is screen-on. For example, in FIG. 6(*b*), the electronic device is in the folded form, the primary screen is on, and the secondary screen is off. In this case, the electronic device may control the primary screen by performing the first operation on the side screen.

In the foregoing embodiments provided in this application, the method provided in the embodiments of this application is described from a perspective that the electronic device (the mobile phone 100) serves as an execution body. To implement functions in the method provided in the embodiments of this application, the terminal device may include a hardware structure and/or a software module, and implement the functions in a form of the hardware structure, the software module, or both the hardware structure and the software module. Whether a function in the foregoing functions is performed in a form of a hardware structure, a software module, or both a hardware structure and a software module depends on a specific application and design constraint conditions of the technical solutions.

According to the context, the term "when" or "after" used in the foregoing embodiments may be interpreted as a meaning of "if" or "after" or "in response to determining" or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)". In addition, in the foregoing embodiments, relationship terms such as first and second are used to distinguish one entity from another entity without limiting any actual relationship and order between these entities.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

It should be noted that a part of this patent application document includes content protected by a copyright. The copyright owner reserves the copyright except for making a copy of the patent documents of the China National Intellectual Property Administration or the content of the recorded patent documents.

What is claimed is:

1. A method, comprising:
    displaying a first interface in a first display region of a foldable screen of a device, wherein the first interface comprises a first control;
    skipping lighting up a third display region when displaying the first interface in the first display region, wherein the third display region is disposed between the first display region and a second display region of the foldable screen, and wherein when the device is in a folded form, an included angle between the first display region and the second display region is less than or equal to a first preset angle;
    mapping the first control to the third display region;
    in response to mapping the first control to the third display region:
        displaying the first control in a first area of the third display region; and
        skipping lighting up areas of the third display region other than the first area;
    detecting a first operation on the first control in the third display region; and
    controlling, in response to detecting the first operation, the first display region or the second display region by executing a function corresponding to the first control in the first display region or the second display region.

2. The method of claim 1, further comprising:
    updating the first interface in the first display region or a second interface in the second display region; or
    adjusting functions in the first display region and the second display region.

3. The method of claim 1, further comprising retaining or deleting the first control from the first interface.

4. The method of claim 1, wherein the first control is a preset control in the first interface, wherein the first control is specified by a user in the first interface, or wherein the first control is a most-frequently or a least-frequently used control in the first interface.

5. The method of claim 1, wherein when a movie playing interface is displayed in the first display region or the second display region, the method further comprises:
    detecting the first operation in the third display region; and
    performing fast-forwarding or rewinding in the movie playing interface.

6. The method of claim 1, wherein when an image preview interface is displayed in the first display region or the second display region, and the image preview interface comprises a first image, the method further comprises:
    detecting the first operation in the third display region; and
    zooming in or zooming out the first image.

7. The method of claim 1, further comprising:
    controlling the first display region when a first touch area in the first display region is smaller than or equal to a second touch area in the second display region; or
    controlling the second display region when the first touch area is larger than the second touch area.

8. The method of claim 1, further comprising:
    controlling the first display region when a first distance between the second display region and a user is longer than a second distance between the first display region and the user; or
    controlling the second display region when the first distance is shorter than the second distance.

9. The method of claim 1, further comprising:
    controlling the first display region when a first image from a first camera in the first display region comprises a user-specific feature; or
    controlling the second display region when a second image from a second camera in the second display region comprises the user-specific feature.

10. The method of claim 1, further comprising:
    controlling the first display region when the first display region is in a screen-on state and the second display region is a screen-off state; or
    controlling the second display region when the first display region is screen-off and the second display region is screen-on.

11. The method of claim 1, further comprising:
    adjusting a display brightness in the first display region or the second display region; or
    adjusting a volume of the device.

12. An apparatus, comprising:
    one or more processors;
    a foldable screen coupled to the one or more processors and comprising a first display region, a second display region, and a third display region, wherein the third display region is disposed between the first display region and the second display region, and wherein when the apparatus is in a folded form, an included angle between the first display region and the second display region is less than or equal to a first preset angle; and
    one or more memories coupled to the one or more processors and configured to store instructions that, when executed by the one or more processors, cause the apparatus to:
        display a first interface in the first display region, wherein the first interface comprises a first control;
        skip lighting up the third display region when displaying the first interface in the first display region;
        map the first control to the third display region;
        in response to mapping the first control to the third display region:

display the first control in the third display region; and skip lighting up areas of the third display region other than the first area;

detect a first operation on the first control in the third display region; and control, in response to detecting the first operation, the first display region or the second display region by executing a function corresponding to the first control in the first display region or the second display region.

13. The apparatus of claim 12, wherein the instructions further cause the apparatus:

update the first interface in the first display region or a second interface in the second display region; or adjust functions in the first display region and the second display region.

14. The apparatus of claim 12, wherein the instructions further cause the apparatus to retain or delete the first control from the first interface.

15. The apparatus of claim 12, wherein the instructions further cause the apparatus to:

use a preset control in the first interface as the first control;

use a control specified by a user in the first interface as the first control; or use a most-frequently or a least-frequently used control in the first interface as the first control.

16. The apparatus of claim 12, wherein when a movie playing interface is displayed in the first display region or the second display region, the instructions further cause the apparatus to:

detect the first operation in the third display region; and perform fast-forwarding or rewinding in the movie playing interface.

17. The apparatus of claim 12, wherein when an image preview interface is displayed in the first display region or the second display region, and the image preview interface comprises a first image, the instructions further cause the apparatus to:

detect the first operation in the third display region; and zoom in or zoom out the first image.

18. The apparatus of claim 12, wherein the instructions further cause the apparatus to:

control the first display region when a first touch area in the first display region is smaller than or equal to a second touch area in the second display region; or control the second display region when the first touch area is larger than the second touch area.

19. The apparatus of claim 12, wherein the instructions further cause the apparatus to:

control the first display region when a first distance between the second display region and a user is longer than a second distance between the first display region and the user; or control the second display region when the first distance is shorter than the second distance.

20. The apparatus of claim 12, wherein the instructions further cause the apparatus to:

control the first display region when a first image captured from a first camera in the first display region comprises a user-specific feature; or control the second display region when a second image from a second camera in the second display region comprises the user-specific feature.

\* \* \* \* \*

UNITED STATES PATENT AND TRADEMARK OFFICE
CERTIFICATE OF CORRECTION

| | |
|---|---|
| PATENT NO. | : 11,983,398 B2 |
| APPLICATION NO. | : 17/638912 |
| DATED | : May 14, 2024 |
| INVENTOR(S) | : Jing Zhang |

It is certified that error appears in the above-identified patent and that said Letters Patent is hereby corrected as shown below:

On the Title Page

Item [56] "CN 1103116457 A 5/2013" should read "CN 103116457 A 5/2013"

Signed and Sealed this
Ninth Day of July, 2024

Katherine Kelly Vidal
Director of the United States Patent and Trademark Office